United States Patent
Beoughter et al.

(10) Patent No.: US 7,984,096 B2
(45) Date of Patent: Jul. 19, 2011

(54) SERVICE-ORIENTED ARCHITECTURE FOR PROCESS CONTROL SYSTEMS

(75) Inventors: Ken J. Beoughter, Round Rock, TX (US); Stephen Gilbert, Austin, TX (US); Mark J. Nixon, Round Rock, TX (US); J. Michael Lucas, Leicestershire (GB)

(73) Assignee: Fisher-Rosemount Systems, Inc., Austin, TX (US)

( * ) Notice: Subject to any disclaimer, the term of this patent is extended or adjusted under 35 U.S.C. 154(b) by 788 days.

(21) Appl. No.: 11/556,554

(22) Filed: Nov. 3, 2006

(65) Prior Publication Data

US 2007/0106761 A1    May 10, 2007

Related U.S. Application Data

(63) Continuation of application No. PCT/US2005/015394, filed on May 4, 2005.

(60) Provisional application No. 60/567,980, filed on May 4, 2004.

(51) Int. Cl.
*G06F 15/16* (2006.01)
(52) U.S. Cl. .............. 709/203; 709/217; 709/228
(58) Field of Classification Search ............. 709/228, 709/203, 217, 219, 227
See application file for complete search history.

(56) References Cited

U.S. PATENT DOCUMENTS

| | | | |
|---|---|---|---|
| 5,168,441 A | 12/1992 | Onarheim et al. | |
| 5,611,059 A | 3/1997 | Benton | |
| 5,631,825 A | 5/1997 | Van Weele et al. | |
| 5,680,409 A | 10/1997 | Qin et al. | |
| 5,706,455 A | 1/1998 | Benton et al. | |
| 5,841,654 A | 11/1998 | Verissimo et al. | |
| 5,926,177 A | 7/1999 | Hatanaka et al. | |
| 6,173,208 B1 | 1/2001 | Park et al. | |
| 6,175,876 B1 * | 1/2001 | Branson et al. | 709/252 |
| 6,362,839 B1 | 3/2002 | Hamilton et al. | |
| 6,385,496 B1 | 5/2002 | Irwin et al. | |
| 6,396,516 B1 | 5/2002 | Beatty | |
| 6,445,963 B1 | 9/2002 | Blevins et al. | |
| 6,571,133 B1 | 5/2003 | Mandl et al. | |
| 6,587,108 B1 | 7/2003 | Guerlain et al. | |

(Continued)

FOREIGN PATENT DOCUMENTS

EP    0 813 129 A2 * 12/1997

(Continued)

OTHER PUBLICATIONS

Camo Software, Inc, The Unscrambler 9.6 product datasheet, www.camo.com, 2 pages.

(Continued)

*Primary Examiner* — Lashonda T Jacobs
(74) *Attorney, Agent, or Firm* — Hanley, Flight and Zimmerman, LLC

(57) ABSTRACT

A service-oriented architecture for process control systems is disclosed. In one example, a method for conveying process control information between a client process and a server process in a process control system establishes a server process including a plurality of process control services, each of which has a corresponding service interface. The example method also establishes a client process having a proxy for each of the plurality of services to which the client process establishes a communicative connection. Additionally, the example method provides port information associated with the service interfaces to the client process to enable the conveyance of process control information between the client process and the server process.

34 Claims, 16 Drawing Sheets

U.S. PATENT DOCUMENTS

| | | | |
|---|---|---|---|
| 6,618,630 B1 | 9/2003 | Jundt et al. | |
| 6,633,782 B1 | 10/2003 | Schleiss et al. | |
| 6,691,280 B1 | 2/2004 | Dove et al. | |
| 6,957,110 B2 | 10/2005 | Wewalaarachchi et al. | |
| 6,973,508 B2 | 12/2005 | Shepard et al. | |
| 7,043,311 B2 | 5/2006 | Nixon et al. | |
| 7,110,835 B2 | 9/2006 | Blevins et al. | |
| 7,308,473 B1 * | 12/2007 | Thomas et al. | 709/203 |
| 7,356,562 B2 * | 4/2008 | Yoon | 709/203 |
| 2001/0010053 A1 * | 7/2001 | Ben-Shachar et al. | 709/105 |
| 2002/0019672 A1 | 2/2002 | Paunonen | |
| 2002/0022894 A1 * | 2/2002 | Eryurek et al. | |
| 2002/0022895 A1 | 2/2002 | Genise et al. | |
| 2002/0055790 A1 | 5/2002 | Havekost | |
| 2002/0077711 A1 | 6/2002 | Nixon et al. | |
| 2003/0014500 A1 * | 1/2003 | Schleiss et al. | |
| 2003/0028269 A1 * | 2/2003 | Spriggs et al. | |
| 2003/0041130 A1 * | 2/2003 | Harrisville-Wolff et al. | 709/221 |
| 2003/0191803 A1 | 10/2003 | Chinnici et al. | |
| 2003/0236576 A1 * | 12/2003 | Resnick et al. | |
| 2004/0075689 A1 * | 4/2004 | Schleiss et al. | |
| 2004/0075857 A1 * | 4/2004 | Akiyoshi et al. | 358/1.13 |
| 2005/0197803 A1 * | 9/2005 | Eryurek et al. | |
| 2005/0197805 A1 * | 9/2005 | Eryurek et al. | |
| 2005/0197806 A1 * | 9/2005 | Eryurek et al. | |
| 2006/0031354 A1 * | 2/2006 | Patrick et al. | 709/206 |
| 2006/0031481 A1 * | 2/2006 | Patrick et al. | 709/224 |
| 2006/0136555 A1 * | 6/2006 | Patrick et al. | 709/203 |
| 2006/0248194 A1 * | 11/2006 | Ly et al. | 709/226 |
| 2007/0061786 A1 * | 3/2007 | Zhou et al. | 717/136 |
| 2008/0034367 A1 * | 2/2008 | Patrick et al. | 718/101 |
| 2008/0140760 A1 * | 6/2008 | Conner et al. | 709/201 |

FOREIGN PATENT DOCUMENTS

| | | | |
|---|---|---|---|
| EP | 1 122 62 A * | 8/2001 | |
| EP | 1798632 A1 | 6/2007 | |
| GB | 2 349 958 A * | 11/2000 | |
| JP | 2002-223211 A | 8/2002 | |
| WO | 95/04314 A1 * | 2/1995 | |
| WO | 02/071169 A * | 9/2002 | |
| WO | 03/075206 A * | 9/2003 | |
| WO | 2005/107409 A2 | 11/2005 | |
| WO | 2005/107416 A1 | 11/2005 | |
| WO | 2005/109122 A1 | 11/2005 | |
| WO | 2005/109123 A1 | 11/2005 | |
| WO | 2005/109124 A1 | 11/2005 | |
| WO | 2005/109125 A1 | 11/2005 | |
| WO | 2005/109126 A1 * | 11/2005 | |
| WO | 2005/109127 A1 | 11/2005 | |
| WO | 2005/109128 A1 | 11/2005 | |
| WO | 2005/109129 A1 | 11/2005 | |
| WO | 2005/109130 A1 | 11/2005 | |
| WO | 2005/109131 A1 * | 11/2005 | |
| WO | 2005/109250 A1 | 11/2005 | |
| WO | 2005/109250 A2 | 11/2005 | |

OTHER PUBLICATIONS

Statsoft, Statistica: Multivariate Statistical Process Control product datasheet, www.statsoft.com, 2 pages.

Umetrics Inc., Product Specification for SIMCA-P 11, www.umetrics.com, 2 pages.

Mehta, Ashish, Ganesamoorthi, Sai, and Wojsznis, Willy, Feedforward Neural Networks for Process Identification and Prediction, Neural Network and Expert Systems Presentation, 2001, 9 pages.

Tzovla, Vasiliki and Zhang, Yan, Abnormal Condition Management using Expert Systems, Neural Network and Expert Systems Presentation, 2001, 9 pages.

UK Intellectual Property Office, Patents Act 1977 Examination Report under Section 18(3), Oct. 26, 2007, 4 pages, United Kingdom.

State Intellectual Property Office of P.R. China, "The Notification of the First Office Action," issued in connection with Chinese application No. 200580014528.3, issued Jun. 26, 2009, 12 pages.

Fisher-Rosemount Systems, Inc., DeltaV Bulk Edit, pp. 1-12, Apr. 2002.

Kopp, John, About.com, C++ Tutorial—Lesson 29: Inheritance, Continued, http://www.cplus.about.com/od/beginnerctutorial/l/aa12050c.htm, downloaded Apr. 27, 2005.

Kopp, John, About.com, C++ Tutorial—Lesson 29: Inheritance, http://cplus.about.com/od/beginnerctutorial/l/aa120502b.htm, downloaded Apr. 27, 2005.

Kopp, John, About.com, C++ Tutorial—Lesson 29: Inheritance Introduction, http://cplus.about.com/od/beginnerctutorial/l/aa120502a.htm, downloaded Apr. 27, 2005.

Kopp, John, About.com, C++ Tutorial—Lesson 17: Classes, Members and Methods, Defining Methods, http://cplus.about.com/od/beginnerctutorial/l/aa070602c.htm, downloaded Apr. 27, 2005.

Kopp, John, About.com, C++ Tutorial—Lesson 17: Classes, Members and Methods, Defining Classes, http://cplus.about.com/od/beginnerctutorial/l/aa070602b.htm, downloaded Apr. 27, 2005.

Kopp, John, About.com, C++ Tutorial—Lesson 17: Classes, Members and Methods, http://cplus.about.com/od/beginnerctutorial/l/aa070602a.htm, downloaded Apr. 27, 2005.

Kopp, John, About.com, C++ Tutorial—Lesson 9: Introduction to Classes, Object Terminology, http://cplus.about.com/od/beginnerctutorial/l/aa041002e.htm, downloaded Apr. 27, 2005.

Kopp, John, About.com, C++ Tutorial—Lesson 9: Introduction to Classes, Using Objects, http://cplus.about.com/od/beginnerctutorial/l/aa041002d.htm, downloaded Apr. 27, 2005.

Kopp, John, About.com, C++ Tutorial—Lesson 9: Introduction to Classes, Defining Classes, htpp://cplus.about.com/od/beginnerctutorial/l/aa041002b.htm, downloaded Apr. 27, 2005.

Patent Cooperation Treaty, International Search Report and Written Opinion of the International Searching Authority for PCT/US2005/015596, Apr. 5, 2006, 12 pages.

Sangyong Han et al., Web Based rSPC (realtime Statistical Process Control) System Supporting XML Protocol, Industrial Electronics, Jun. 2001, pp. 399-403, Piscataway, New Jersey.

Patent Cooperation Treaty, International Search Report and Written Opinion of the International Searching Authority for PCT/US2005/015439, Aug. 10, 2005, 12 pages.

Patent Cooperation Treaty, International Search Report and Written Opinion of the International Searching Authority for PCT/US2005/015394, Mar. 20, 2006, 15 pages.

D. Chen, Real-Time Management in the Distributed Environment, Ph.D. Thesis, 1999.

Patent Cooperation Treaty, International Search Report and Written Opinion of the International Searching Authority for PCT/US2005/015585, May 9, 2006, 14 pages.

Developers.Sun.Com, Core J2EE Patterns—Data Access Object, http://web.archive.org/web/20040414043406/java.sun.com/blueprints/corej2eepatterns/Patterns/DataAccessObject.html, Apr. 14, 2006, 10 pages.

Mohr S et al, BizTalk and Application Integration—Translating Between Message Specification: BizTalk Mapper, Professional BizTalk, Apr. 14, 2001, 3 pages.

W3C, XSL Transformations (XSLT), Version 1.0, W3C Recommendation, Nov. 16, 1999, 11 pages.

Nixon, Mark et al., U.S. Appl. No. 10/575,173, filed Apr. 7, 2006 for "Graphic Display Configuration Framework for United Process Control System Interface."

State Intellectual Property Office of P.R. China issued "The Notification of the Second Office Action," on Sep. 2, 2010 in Chinese Patent Application No. 200580014528.3, 7 pages.

UK, Combined Search and Examination Report Under Sections 17 & 18(3), Aug. 29, 2008, 4 pages.

Japanese Patent Office issued "Summary of Notice of Reasons for Rejection," and its English translation, on Dec. 21, 2010, in Japanese Patent Application No. 2007-511521, 4 pages.

Ryo Nishiya, "World of .Internet supported by XML and SOAP", .NET, Japan, Shoueisha, Mar. 1, 2001, pp. 66-78, Visual Basic magazine, Mar. 2001, Annex, (14 pages and First page translated into English).

* cited by examiner

SERVICE-ORIENTED ARCHITECTURE FOR PROCESS CONTROL SYSTEMS

RELATED APPLICATIONS

This patent is a continuation of International Application Serial Number PCT/US2005/015394, entitled "Service Oriented Architecture for Process Control Systems" filed on May 4, 2005, which claims the benefit of provisional U.S. Patent Application No. 60/567,980, filed May 4, 2004, which is hereby incorporated by reference herein in its entirety.

FIELD OF THE DISCLOSURE

The present invention relates generally to process control systems and, more specifically, to a service-oriented architecture for process control systems.

BACKGROUND

Process control systems, like those used in chemical, petroleum or other processes, typically include one or more process controllers and input/output (I/O) devices communicatively coupled to at least one host or operator workstation and to one or more field devices via analog, digital or combined analog/digital buses. The field devices, which may be, for example, valves, valve positioners, switches and transmitters (e.g., temperature, pressure and flow rate sensors), perform functions within the process such as opening or closing valves and measuring process parameters. The process controllers receive signals indicative of process measurements made by the field devices and/or other information pertaining to the field devices, use this information to implement a control routine, and then generate control signals that are sent over the buses or other communication lines to the field devices to control the operation of the process. In this manner, the process controllers may execute and coordinate control strategies using the field devices via the busses and/or other communication links communicatively coupling the field devices.

Information from the field devices and the controllers may be made available to one or more applications (i.e., software routines, programs, etc.) executed by the operator workstation (e.g., a processor-based system) to enable an operator to perform desired functions with respect to the process, such as viewing the current state of the process, evaluating the process, modifying the operation of the process, etc. Many process control systems also include one or more application stations. Typically, these application stations are implemented using a personal computer, workstation, or the like that is communicatively coupled to the controllers, operator workstations, and other systems within the process control system via a local area network (LAN). Each application station may execute one or more software applications that perform campaign management functions, maintenance management functions, virtual control functions, diagnostic functions, real-time monitoring functions, safety-related functions, configuration functions, etc. within the process control system.

The software elements (e.g., programs) used to implement the various applications of many process control systems typically rely heavily on the use of object-oriented programming technologies and architectures. Such object-oriented programming technologies and architectures are based on a hierarchical arrangement of software objects in which higher level (e.g., more complex) software objects are built from and, thus, inherit, the properties of one or more lower level objects. The heavy use of inheritance within these object-oriented programming constructs enables a high degree of code (i.e., software instructions, programs, etc.) sharing, which tends to significantly reduce the overall amount of code or software required to implement the control system.

Although known object-oriented programming constructs can advantageously reduce the amount of software or code needed to implement a relatively complex process control system, the high degree of inheritance or code sharing associated with these constructs results in a high degree of dependence (e.g., data dependencies) between the various software routines or components making up the control system. As a result, independent development and/or versioning of these various software routines may be difficult or impossible. For example, in some process control systems employing the above-mentioned object-oriented constructs, the process control system applications (e.g., process monitoring applications), database services, and runtime services are tightly bound (i.e., are highly dependent on one another). In particular, client applications may be built on a common set of data components representing data in the database. Thus, any change in the common data components requires the client applications to be rebuilt. As a result, the data dependencies inherent in these known objected-oriented process control software architectures make independent versioning or development of the database components and runtime software components very difficult or impossible, particularly in cases where different software components of the process control system are developed in different locations (i.e., development sites or centers). To address the data dependencies inherent in these known object-oriented architectures, process control software developers have been forced to closely coordinate the development of database, runtime, and system software components so that these components are built and released in a unified manner.

SUMMARY

In one example, a method and apparatus for conveying process control information between a client process and a server process in a process control system establishes a server process including a plurality of process control services, each of which has a corresponding service interface. The example method and apparatus also establishes a client process having a proxy for each of the plurality of services to which the client process establishes a communicative connection. Additionally, the example method and apparatus provides endpoint information (e.g., port information, URL, URI, etc.) associated with the service interfaces to the client process to enable the conveyance of process control information between the client process and the server process.

In another example, a method of binding information to a runtime application provides a data context associated with the runtime application to a resource manager and associates, via the resource manager, at least one property from the data context with at least one of a variable, a script, or a data source reference. Additionally, the method binds the at least one property to the at least one of the variable, the script, or the data source reference.

DETAILED DESCRIPTION

Figure 1:
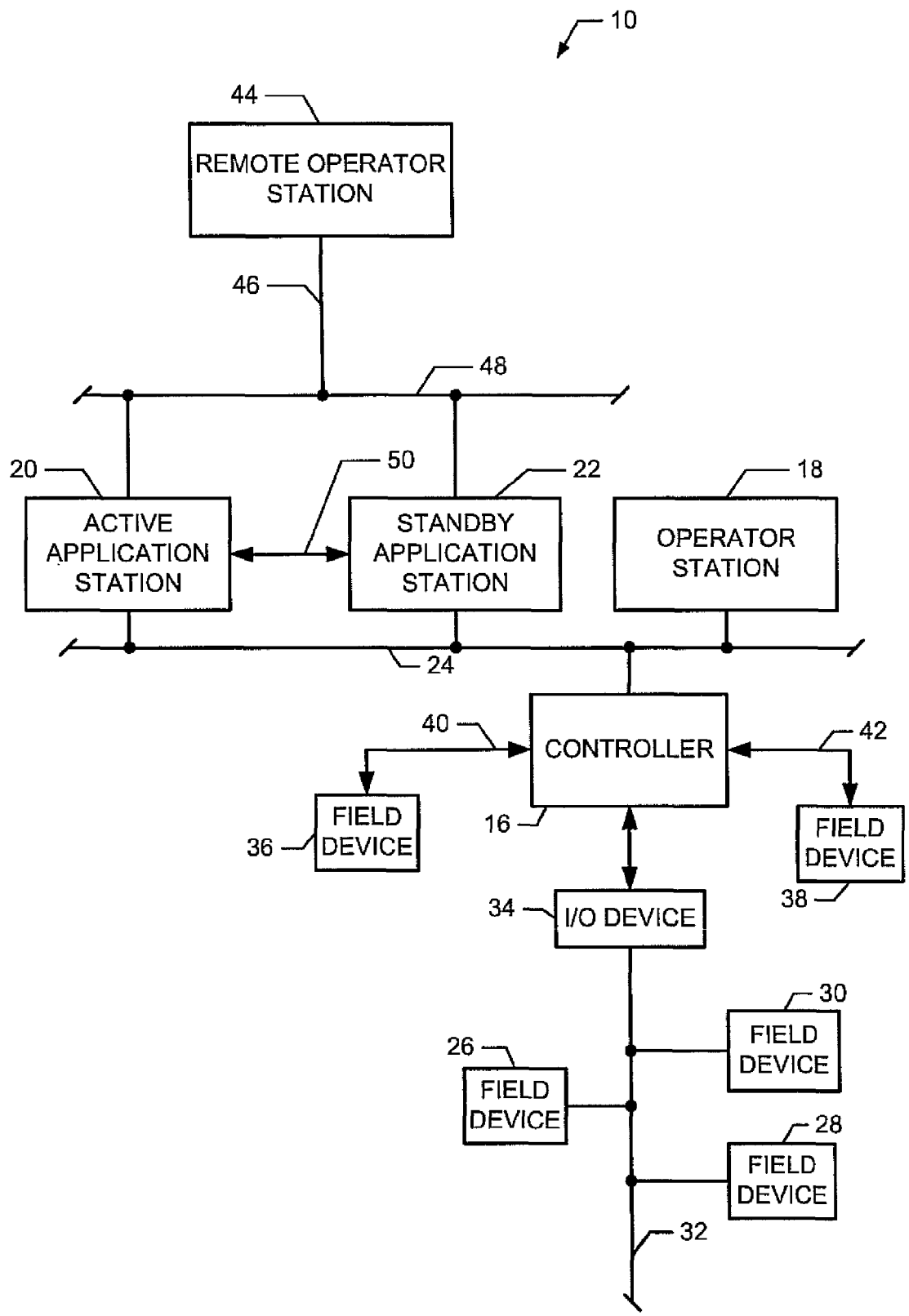
FIG. 1 is a block diagram of an example process control system that uses the service-oriented architecture described herein.

In general, the example apparatus, methods, and articles of manufacture described herein may be used within a process control system to provide a high degree of independence between the various software elements (e.g., programs, applications, services, etc.) composing the process control system. More specifically, the examples described herein utilize a software and hardware architecture that provides a plurality of loosely coupled (i.e., substantially data independent) core services on which a plurality of independent process control-related applications is layered. Each of the core services provides a well-defined external interface (e.g., schemas, parameters that are passed into and/or out of the service, data formats, etc.) that can be individually tested and versioned. Similarly, the process control-related applications can be built or developed in a highly independent manner (e.g., with minimal or little coordination between different development teams, locations, etc.) owing to the substantially data independent nature of the applications. In other words, software developers in one location developing a particular application for use within the overall process control system do not necessarily have to be closely involved or informed in connection with the development of another application being developed by another group of software developers in another physical location. In this manner, the example service-oriented architecture described herein minimizes or eliminates the need for different software development teams to spend significant amounts of time coordinating (e.g., via meetings and/or other forms of communication) their respective development efforts, thereby substantially reducing development times and costs for their respective development efforts.

In contrast to many known object-oriented implementations or architectures, which are focused on code or software reuse, the example service-oriented process control architecture described herein emphasizes a relatively loose coupling (e.g., relatively little, if any, data dependency) between data services and/or client applications. Additionally, with known object-oriented implementations, process control software applications or programs are essentially a composition or arrangement of software elements drawn from shared class libraries. In contrast, the example service-oriented architecture described herein utilizes applications composed of relatively autonomous services. More specifically, rather than sharing class information, the relatively autonomous services associated with the example service-oriented architecture described herein share schemas (for structure) and contracts (for behavior). Each of the relatively autonomous services (e.g., data services) described herein publishes a contract (e.g., using an extensible markup language such as XML) that describes the structure of the messages that the service can send and receive.

Still further, known object-oriented process control software implementations treat communication between software elements or components (e.g., services) and developers (e.g., software developers at different development sites) as inexpensive (e.g., from a processing efficiency standpoint) and implicit. In contrast, the example service-oriented architecture described herein treats such communication as relatively expensive and explicit. Accordingly, the example service-oriented architecture described herein is configured to reduce the number and complexity of abstractions that must be shared across services (i.e., across service boundaries associated with the various software components composing the core services of the process control software).

In further contrast to known object-oriented implementations that treat deployment of applications in a unitary fashion (i.e., a common release of a group of interrelated applications), the example service-oriented process control software architecture described herein treats application deployment in an on-going, more discrete manner. For example, with the example service-oriented architecture described herein, client applications may be versioned independently of the underlying data services used by those applications such that the aggregate state of the overall system and applications may become mixed over time. In some cases, for example, a service may be deployed well before applications making use of the service have been deployed. Additionally, the substantial independence of the applications and services enables the services and/or applications to evolve independently (i.e., to be developed or modified in an independent manner) at different rates over time. However, to ensure a greater degree of integrity in the interoperation of the relatively highly decoupled services and/or applications utilized in the example service-oriented architecture or framework described herein, each service may be configured to perform a validation process on each message that it receives from another service or application.

As described in greater detail herein, the example service-oriented architecture may be advantageously applied to enable the linkage, binding or, more generally, the communicative or operative coupling of parameters associated with runtime applications to variables, executable scripts, and/or the aforementioned data services. For example, the parameters used in connection with rendering graphical display elements associated with a process control system user interface application may be communicatively or operatively coupled to a runtime data service. In this example, changes in data to be coupled to the parameters can be automatically propagated from the data service to the display application, which can then update, for example, a graphic display to reflect the changed data. In one implementation, the well-known Avalon and Indigo software platforms provided by Microsoft Corporation may be used to enable the binding of the properties associated with the display elements to variables, scripts, and/or data services at runtime. However, any other suitable software platform could be used instead of or in addition to Avalon and/or Indigo.

As described in greater detail below, the example service-oriented architecture described herein includes a data services layer that can provide process control-related data to a data sources layer. As described below, the data sources layer provides relatively generic access to the data services layer from within an application. A resource manager layered on the data sources layer manages variables, scripts, and/or references into data sources associated with one or more runtime applications, displays, graphic elements, parameters, etc. The resource manager described herein advantageously enables, for example, the parameters associated with graphic display elements to be bound to one or more variables or data services (e.g., process control data sources provided via a server) at runtime, as opposed to statically coding the coupling(s) between the parameters and such variables or data sources.

More specifically, with the example apparatus, methods, and articles of manufacture described herein, a display application may request values or other data or information for the various properties associated with its graphic elements from the resource manager. In turn, the resource manager may be configured at runtime to provide (e.g., map, relate, or otherwise associate) data sources to the properties used by the display application. As a result, the display application does not have to be statically coded to define relationships between its graphic elements and variables or data sources that are bound to the parameter values associated with those graphic elements. Instead, the resource manager can be configured at runtime to more flexibly and dynamically define those relationships.

FIG. 1 is a block diagram of an example process control system 10 that uses the example service-oriented architecture described herein. As depicted in FIG. 1, the process control system 10 includes a controller 16, an operator station 18, an active application station 20 and a standby application station 22, all of which may be communicatively coupled via a bus or local area network (LAN) 24, which is commonly referred to as an application control network (ACN). The operator station 18 and the application stations 20 and 22 may be implemented using one or more workstations or any other suitable computer systems or processing units. For example, the application stations 20 and 22 could be implemented using single processor personal computers similar to an example processor system 1602 shown in FIG. 16 below, single or multi-processor workstations, etc. In addition, the LAN 24 may be implemented using any desired communication medium and protocol. For example, the LAN 24 may be based on a hardwired or wireless Ethernet communication scheme, which is well known and, thus, is not described in greater detail herein. However, as will be readily appreciated by those having ordinary skill in the art, any other suitable communication medium and protocol could be used. Further, although a single LAN is shown, more than one LAN and appropriate communication hardware within the application stations 20 and 22 may be used to provide redundant communication paths between the operator station 18, the application stations 20 and 22, and the controller 16.

The controller 16 may be coupled to a plurality of smart field devices 26, 28 and 30 via a digital data bus 32 and an input/output (I/O) device 34. The smart field devices 26-30 may be Fieldbus compliant valves, actuators, sensors, etc., in which case the smart field devices 26-30 communicate via the digital data bus 32 using the well-known Fieldbus protocol. Of course, other types of smart field devices and communication protocols could be used instead. For example, the smart field devices 26-30 could instead be Profibus or HART compliant devices that communicate via the data bus 32 using the well-known Profibus and HART communication protocols. Additional I/O devices (similar or identical to the I/O device 34) may be coupled to the controller 16 to enable additional groups of smart field devices, which may be Fieldbus devices, HART devices, etc., to communicate with the controller 16.

In addition to the smart field devices 26-30, one or more non-smart field devices 36 and 38 may be communicatively coupled to the controller 16. The non-smart field devices 36 and 38 may be, for example, conventional 4-20 milliamp (mA) or 0-10 volts direct current (VDC) devices that communicate with the controller 16 via respective hardwired links 40 and 42.

The controller 16 may be, for example, a DeltaV™ controller sold by Emerson Process Management, LLLP. However, any other controller could be used instead. Further, while only one controller is shown in FIG. 1, additional controllers of any desired type or combination of types could be coupled to the LAN 24. The controller 16 may perform one or more process control routines associated with the process control system 10. Such process control routines may be generated by a system engineer or other system operator using the operator station 18 and downloaded to and instantiated in the controller 16.

As depicted in FIG. 1, the example process control system 10 may also include a remote operator station 44 that is communicatively coupled via a communication link 46 and a LAN 48 to the application stations 20 and 22. The remote operator station 44 may be geographically remotely located, in which case the communication link 46 is preferably, but not necessarily, a wireless communication link, an internet-based or other packet-switched communication network, telephone lines (e.g., digital subscriber lines), or any combination thereof.

As depicted in the example of FIG. 1, the active application station 20 and the standby application station 22 are communicatively coupled via the LAN 24 and via a redundancy link 50. The redundancy link 50 may be a separate, dedicated (i.e., not shared) communication link between the active application station 20 and the standby application station 22. The redundancy link 50 may, for example, be implemented using a dedicated Ethernet link (e.g., dedicated Ethernet cards in each of the application stations 20 and 22 that are coupled to each other). However, in other examples, the redundancy link 50 could be implemented using the LAN 24 or a redundant LAN (not shown), neither of which is necessarily dedicated, that is communicatively coupled to the application stations 20 and 22.

Generally speaking, the application stations 20 and 22 continuously, by exception, or periodically, exchange information (e.g., in response to parameter value changes, application station configuration changes, etc.) via the redundancy link 50 to establish and maintain a redundancy context. The redundancy context enables a seamless or bumpless handoff or switchover of control between the active application station 20 and the standby application station 22. For example, the redundancy context enables a control handoff or switchover from the active application station 20 to the standby application station 22 to be made in response to a hardware or software failure within the active application station 20 or in response to a directive from a system operator or user or a client application of the process control system 10.

Figure 2:
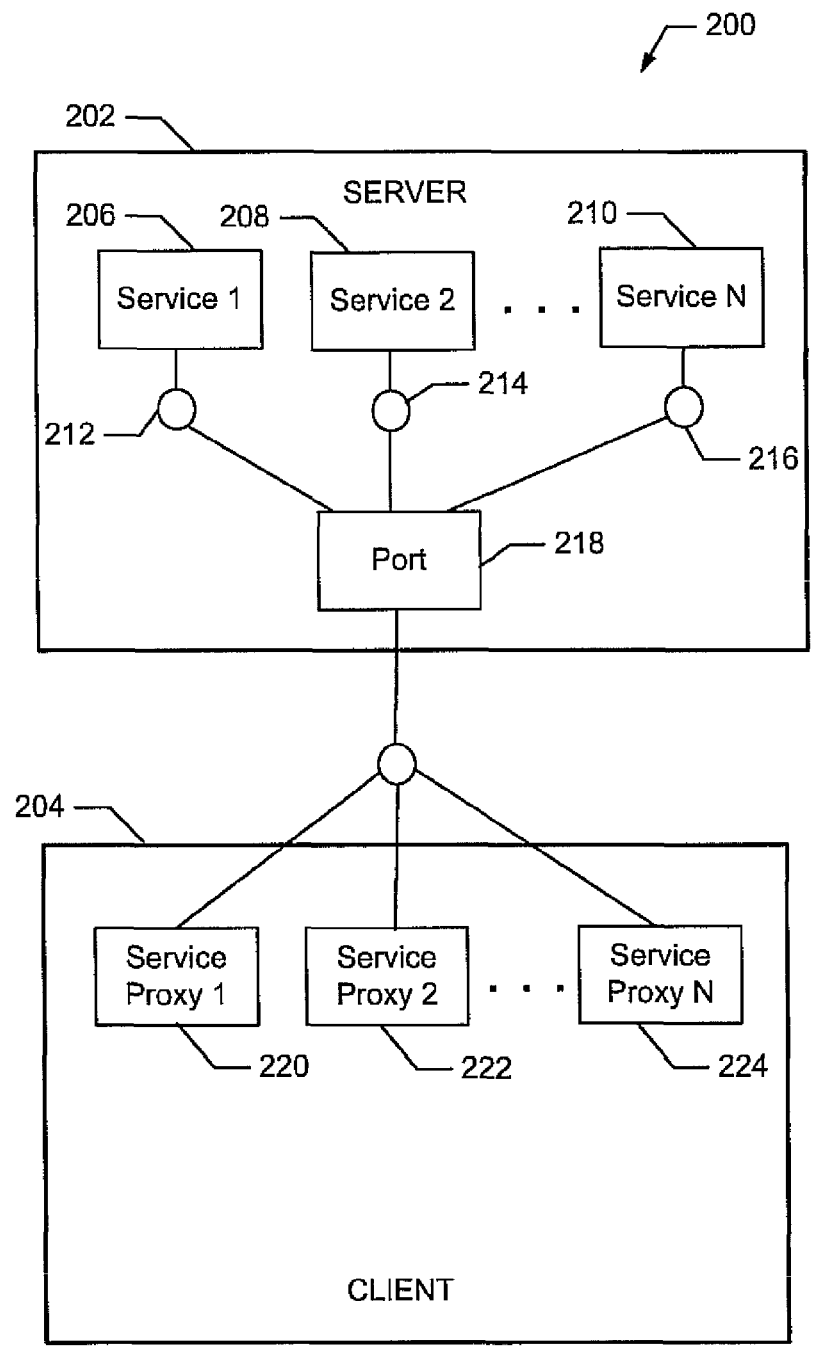
FIG. 2 is a block diagram depicting an example service-oriented architecture that may be used within the example process control system of FIG. 1.

FIG. 2 is a block diagram depicting an example service-oriented architecture or structure 200 that may be used within the example process control system 10 of FIG. 1. As shown in FIG. 2, the example service-oriented architecture 200 includes a server 202 and a client 204. The server 202 includes a plurality or collection of services 206, 208, and 210, some or all of which may perform related functions. The services 206, 208, and 210 provide respective interfaces (e.g., one or more sets of exposed parameters) 212, 214, and 216 that enable communication with the client 204 via a communication port 218. The service interfaces 212, 214, and 216 are substantially generic in nature and, thus, are substantially independent of the schemas (i.e., data format, protocol, etc.) used for the data contained in configuration and/or runtime databases associated with the example process control system 10 of FIG. 1. As a result, the service interfaces 212, 214, and 216 only require modification (e.g., updating) if new service capabilities (e.g., functions) are added to one or more of the services 206, 208, and 210. Thus, the service interfaces 212, 214, and 216 do not have to be changed unless data objects, which use the newly exposed interfaces, are added for use within the process control system 10 (FIG. 1).

The server 202 may be implemented as software executed on a processor-based system such as, for example, one or more of the application stations 20 and 22 and/or operator stations 18 and 44 shown in the example system 10 of FIG. 1. Of course, the server 202 may be implemented using any other processor-based system or workstation coupled to the example process control system 10 (FIG. 1).

The client 204 includes a plurality of service interface proxies 220, 222, and 224, each of which corresponds to one of the services 206, 208, and 210. The number of service interface proxies used by the client 204 may be fewer than the number of services provided by the server 202. In other words, the client 204 preferably creates proxies only for the services to which it requires access. Thus, the client 204 may generate one or more proxies as needed to access or interact with one or more of the services 206, 208, and 210 provided by the server 202.

Similar to the server 202, the client 204 may be implemented as software executed on a processor-based system such as, for example, one or more of the application stations 20 and 22 and/or one or more of the operator stations 18 and 44. In one example implementation, the client 204 may utilize a web browser framework (e.g., Internet Explorer) or the like to access one or more of the services 206, 208, and 210 provided by the server 202. However, any other desired software framework may be used instead of or in addition to such a web browser framework. More generally, the client 204 may represent any desired application within the example process control system 10 (FIG. 1). Thus, the client 204 may, for example, be a configuration application, a maintenance application, a monitoring application, a process control application, and/or any other application or combination of applications. As described in greater detail below in connection with FIGS. 14 and 15, the client 204 (i.e., the client application(s)) may include display functionality (e.g., graphical user interface functionality) to enable one or more system operators, engineers, and/or any other users to view and/or change process control data during configuration operations, runtime, etc.

While the example architecture 200 of FIG. 2 depicts a single server in communication with a single client, additional servers and clients may be used if desired. For example, in some implementations, the client 204 may communicate with, interoperate with, and/or access services in more than one server. Likewise, in these implementations or other implementations, the example server 202 (or other individual servers) may communicate with and/or interoperate with multiple clients. Additionally, it should be recognized that the client 204 may communicate with another system and function as a server for purposes of those communications. Likewise, in the case that the server 202 communicates with a system other than the client 204, it may function as a client for those communications. Further, while the services 206, 208, and 210 are depicted as being implemented within the server 202, one or more of the services 206, 208, and 210 may instead be implemented on the client 204.

Thus, with the example service-oriented architecture 200 of FIG. 2, the services 206, 208, and 210 are substantially decoupled (e.g., in terms of data dependencies) from one another and from applications that make use of (e.g., call) the services 206, 208, and 210. Such decoupling advantageously enables the software associated with each of the services 206, 208, and 210 to be independently modified or versioned and released for field use without having to modify or version the application(s) that are utilized by the client 204 and which access the services 206, 208, and 210. Likewise, the application(s) associated with the client 204 may be independently modified or versioned without having to modify or version the services 206, 208, and 210, as long as the application(s) associated with the client 204 adhere to or are compatible with the interfaces 212, 214, and 216 of the respective services 206, 208, and 210. Thus, instead of statically defining relationships between the applications associated with the client 204 and one or more of the services 206, 208, and 210 by fixing such relationships (i.e., creating data dependencies) at the time the software associated with the applications and/or the services 206, 208, and 210 is generated, the example architecture 200 of FIG. 2 allows such relationships to be established dynamically at runtime.

As described in greater detail below, the example service-oriented architecture 200 may provide a variety of core services and functions. Specifically, the example architecture 200 may provide a discovery service for registering and locating services within the example process control system 10 (FIG. 1). The example architecture 200 may also provide a session service for enabling logging into and out of one or more of the applications associated with the client 204, runtime services for providing access to local and remote runtime information, database services for accessing various process control databases, and a version control service for storing and retrieving versioning information associated with services and/or applications used within the example process control system 10 (FIG. 1). Additionally, the example architecture 200 may provide an historian service for querying for historical information, an historian scanner service, which requires interaction with the runtime and historian services, alarms and events services that enable reading of alarm information, and OLE for process control (OPC) data services. A more detailed description of each of the example services noted above is provided below. However, it should be understood that other services in addition to those specifically described herein and/or alternative to those described herein may be used if desired. Further, it should be recognized that preferably, but not necessarily, the services 206, 208, and 210 are typically associated with process control data gathering and processing functions with which a system user (e.g., a system operator, engineer, etc.) does not interact directly. Rather, such services (e.g., the services 206, 208, and 210) typically provide their data to (or receive data from) a client application with which a user interacts (e.g., a runtime graphical user interface). Further, such services (e.g., the services 206, 208, and 210) typically provide information or data that is useful to multiple client applications. For example, a service providing access to a process control database may be useful to multiple client applications such as, for example, graphical user interfaces providing information relating to process control system operation, maintenance, history, etc. By separating the service-like functions (e.g., database access functions) from client-related functions (e.g., user interface functions), graphical user interfaces and the like can be versioned, modified, etc. without having to modify the services with which the graphical user interface exchanges data. Likewise, the services can be versioned or modified and/or new services can be added without having to modify the applications providing the graphical user interface functionality.

Figure 3:
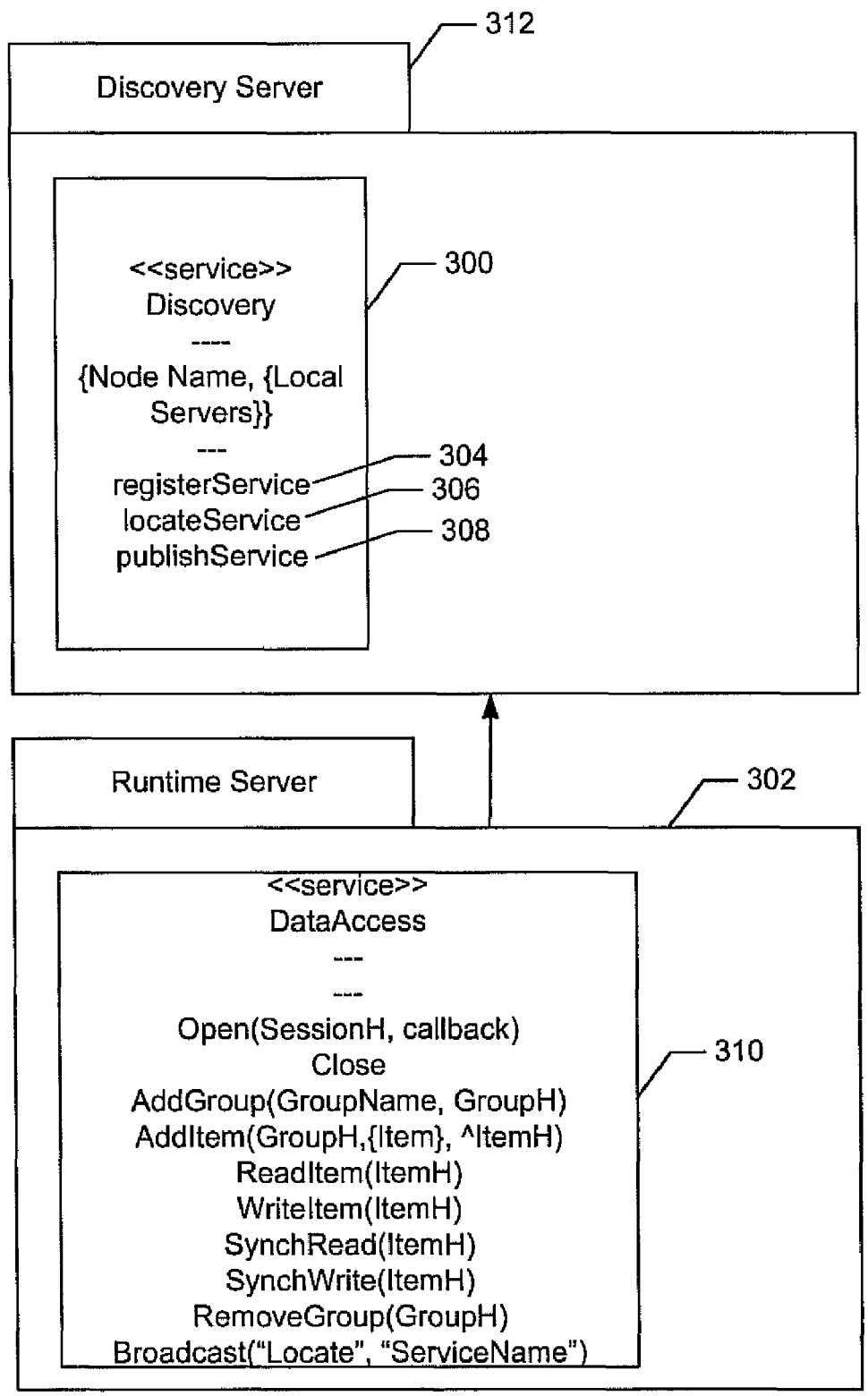
FIG. 3 is a diagram depicting the relationship between a discovery service provided by the example architecture of FIG. 2 and a runtime server.

FIG. 3 is a diagram representing the relationship between an example discovery service 300 that may be provided by the example architecture 200 of FIG. 2 and a runtime server 302. In general, the example discovery service 300 provides a service registration function 304, a service location function 306, and a service publication function 308.

Figure 7:
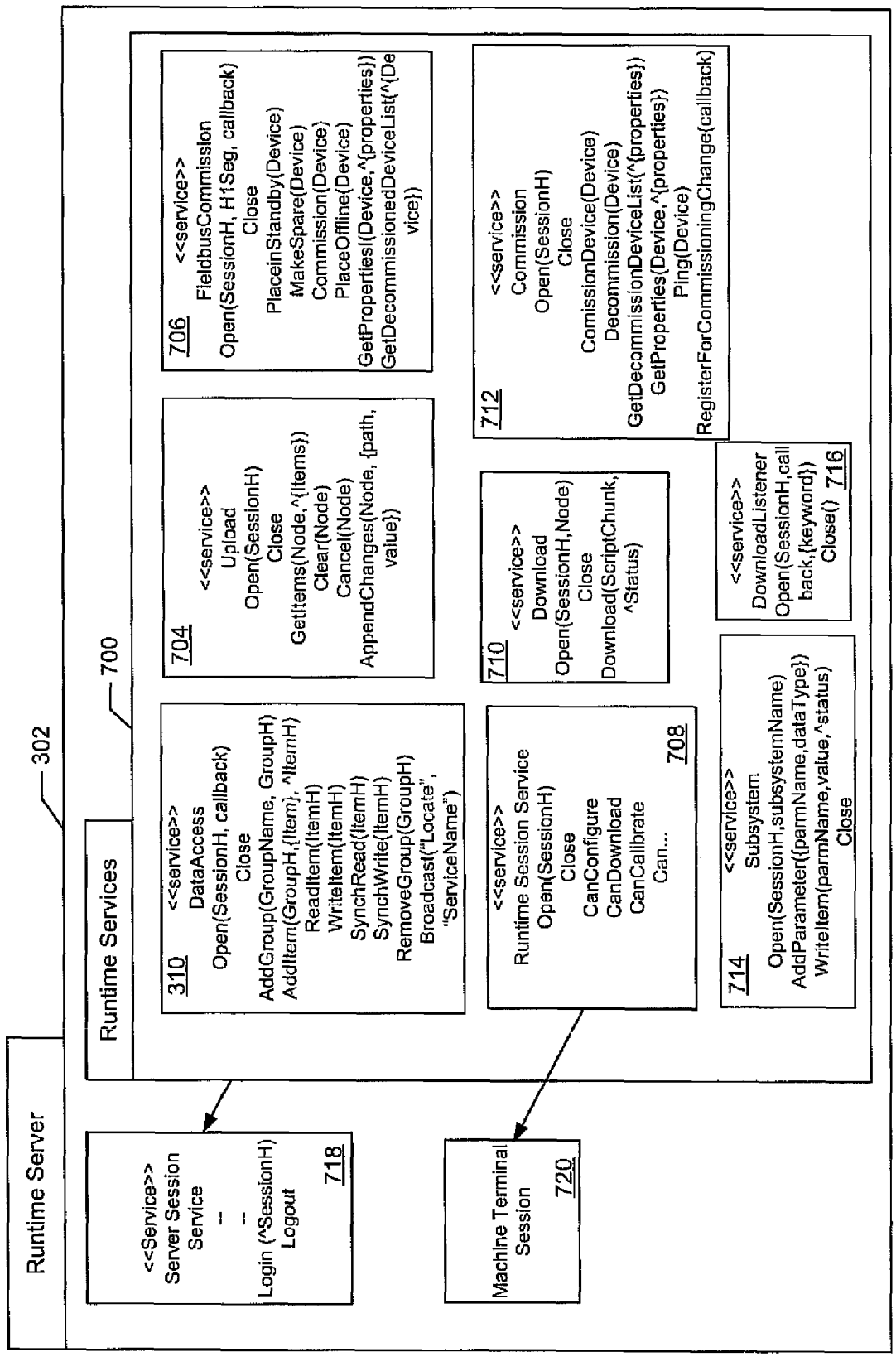
FIG. 7 is a more detailed diagrammatic view of runtime services that may be provided by the example runtime server of FIG. 3.

As depicted in FIG. 3, the discovery service 300 and, thus, the registration, location, and publication functions 304, 306, and 308 cooperate with a data access service 310 provided by the runtime server 302. The data access service 310, which is one of a plurality of services provided by the runtime server 302 discussed below in connection with FIG. 7, provides an interface to enable querying for information relating to the services that may be installed on each node (e.g., each server) within a process control system (e.g., the example system 10 of FIG. 1).

Services may be located and/or registered using uniform resource identifiers (URI's). Such URI's may take the form of an address including a server identifier field, a port field, a path identification field, and/or a query string. However, any other desired URI format may be employed to achieve identical or similar results. Some example URI formats (i.e., an identity role, an http address, and a custom http address) are shown below.

---
Identity Role
---

Soap://www.contoso.com:ppp/whatsnew.aspx?date=today
```
  |                    |   |                |-optional query string
  |                    |   |-path identifier
  |                    |-port
  |-server identifier
```

Transport address for http

Soap.http://www.contoso.com:ppp/whatsnew.aspx?date=today
```
  |  |                 |   |                |-optional query string
  |  |                 |   |-path identifier
  |  |                 |-port
  |  |-server identifier
  |-scheme identifier
```

---
-continued

Custom Transport address
---

Soap.starburn://hostname:pppp/whatsnew.aspx?date=today
```
  |  |         |    |                |-optional query string
  |  |         |    |-path identifier (our service names)
  |  |         |-port
  |  |-server identifier
  |-scheme identifier
```

Figure 4:
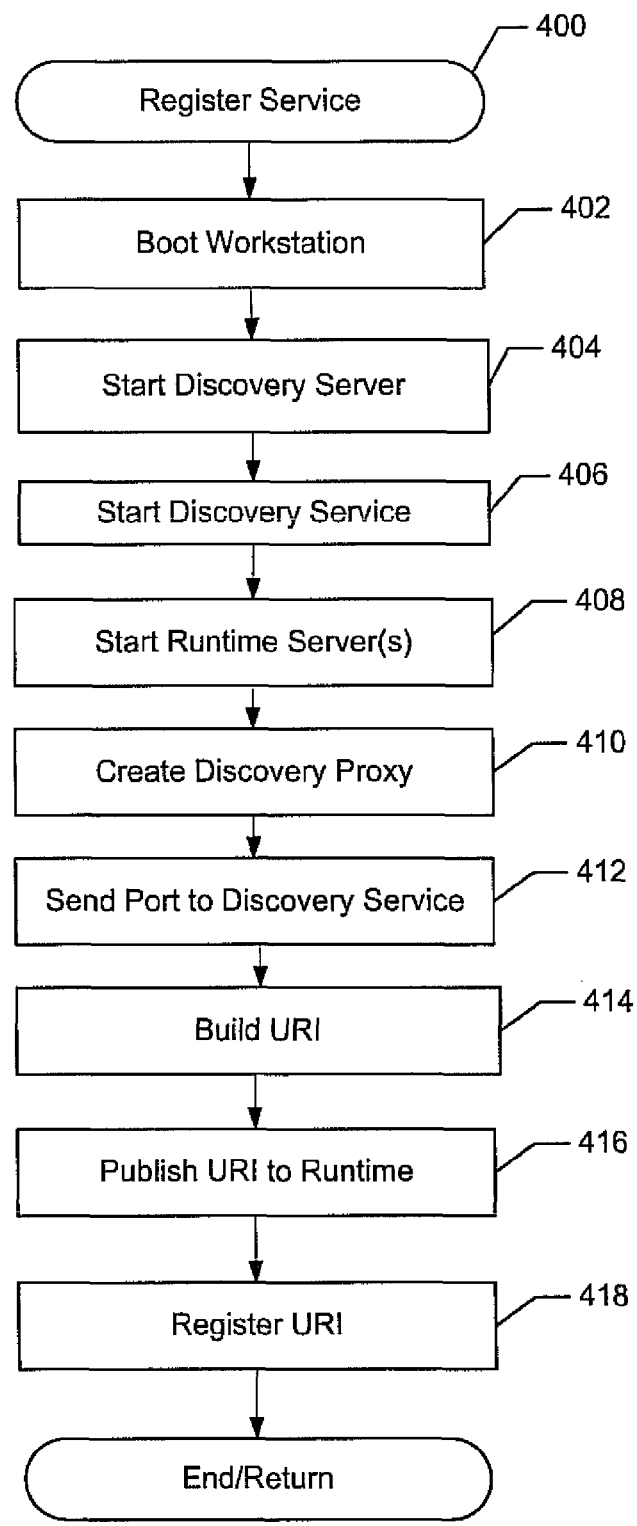
FIG. 4 is a flow diagram depicting one manner in which the discovery service of FIG. 3 and its hosting server interoperate with the data access service of FIG. 3 and its hosting server.

FIG. 4 is a flow diagram depicting one manner in which the example discovery service 300 (FIG. 3) and its hosting discovery server 312 collaborate or interoperate with the data access service 310 and its hosting runtime server 302. In general, the process depicted in FIG. 4 enables one or more runtime services (e.g., the example runtime services 700 of FIG. 7) to be registered via the discovery server 312. Turning in detail to FIG. 4, a registration process 400 begins when a workstation (e.g., an operator station, application station, etc.) boots (block 402). The workstation then instantiates or starts the discovery server (e.g., the discovery server 312 of FIG. 3) (block 404) which, in turn, starts the discovery service (e.g., the discovery service 300 of FIG. 3) (block 406). Upon starting the discovery service at block 406, the discovery server (which hosts the discovery service) publishes URI's previously registered with the discovery service.

After starting the discovery service at block 406, the workstation starts the runtime server(s) (block 408). Then, the runtime server(s) create a discovery proxy by creating a URI placeholder and associating a port with (or allocating a port to) the URI (block 410). The port number allocated at block 410 is then passed to the discovery service (block 412).

After sending the port number to the discovery service at block 412, the runtime server(s) build a URI to be registered using the port number allocated at block 410 (block 414) and then publish the URI to be registered to the runtime service (block 416). The process 400 then registers the URI published at block 416 to the discovery service via a discovery proxy (block 418).

Figure 5:
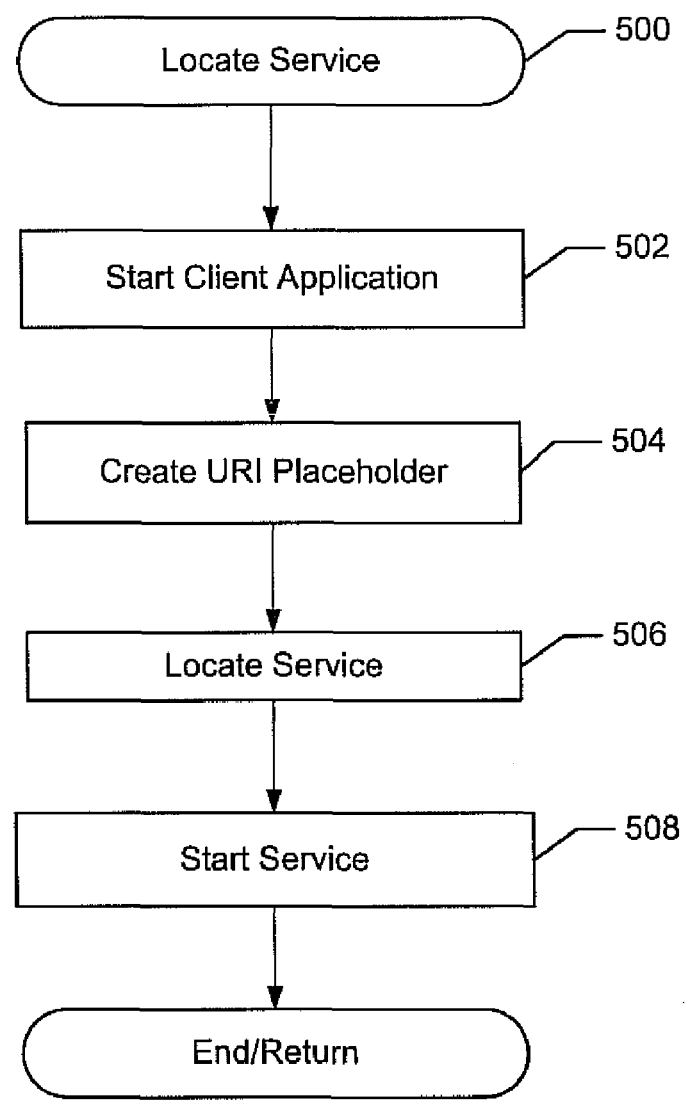
FIG. 5 is an example process by which the discovery service of FIG. 3 may locate a service.

FIG. 5 is an example process 500 by which the discovery service may locate a service (e.g., determine a URI for a desired service). The example process 500 begins when a client application is started (block 502). The client application then creates a placeholder for the URI to be determined (block 504) and calls the locate function within the discovery service (passing the name of the service to be located) via a discovery proxy (block 506). The URI of the service to be located returned to the client application as a result of the operation at block 506 is then used to start the located service via a service proxy (block 508).

Figure 6:
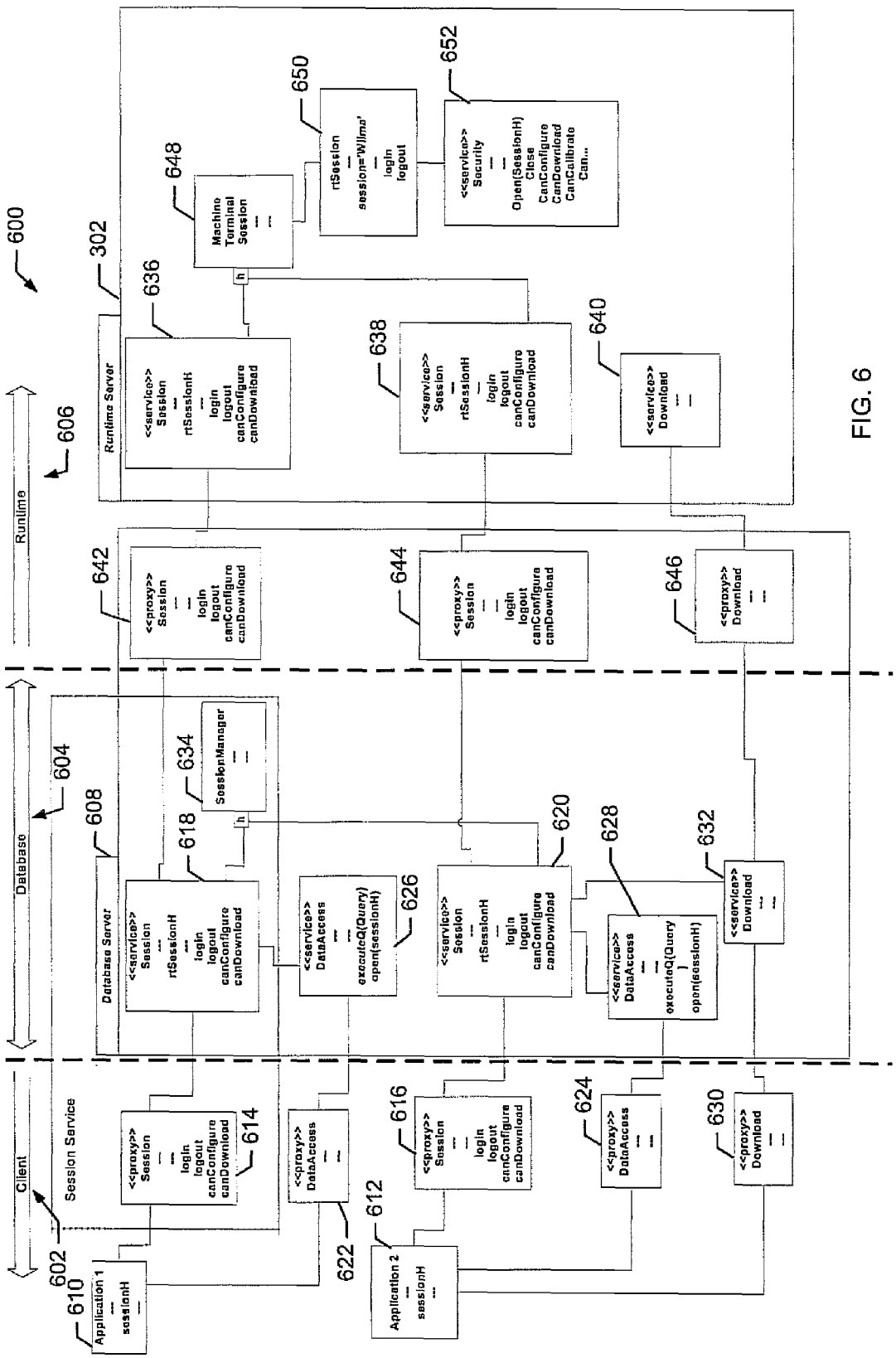
FIG. 6 is a diagram depicting an example implementation of a session service.

FIG. 6 is a diagram depicting an example implementation of a session service 600. In general, the example session service 600 loads into each client application and tracks the privileges associated with the application and user invoking the application. Thus, each service server described herein includes a session service that coordinates access to the services provided by the server and validates security credentials associated with a user/client application combination requesting access to one or more of the services provided by the server.

In operation, a client application connects to a server using a specific URI and requests a session service interface. The session service interface provides both login and logout functions. When the login function is called, security validations are performed based on the requesting client application and user identity and, if security validations are acceptable, a session handle is returned and the requesting client application is connected to a runtime session. If the client application requests connection to another (e.g., an additional) service provided by the server, the client application passes in the session handle to the server and the server uses the session handle to internally add another service to the session associated with that client application. When the logout function is called, all services that have not been explicitly closed by the client application are closed.

Now turning in detail to FIG. 6, the example session service implementation 600 includes a client process 602, a database process 604, and a runtime process 606. The client process 602 may include one or more applications running on, for example an application station (e.g., the example application station 20 of FIG. 1), an operator station (e.g., the operator station 18 of FIG. 1), and/or any other system capable of executing machine readable instructions, code, or software. The database process 604 may be performed in whole or part via a database server 608, and the runtime process 606 may be performed in whole or part via the runtime server 302 (FIG. 3).

As depicted in FIG. 6, the client process 602 of the example session service 600 includes a plurality of client applications 610 and 612 having respective session service proxies 614 and 616, which correspond to session service instances 618 and 620 within the database server 608. Additionally, each of the example applications 610 and 612 associated with the client process 602 requires database access and, thus, include respective proxies 622 and 624 associated with data access service instances 626 and 628 provided by the database server 608. The example client process 602 also provides a proxy 630 associated with a download service 632 that may be provided by the database server 608. The database server 608 further includes a session manager 634 that tracks and/or manages the active sessions (e.g., the sessions 618 and 620) within the database server 608.

The sessions 618 and 620 and the download service 632 within the database server 608 are operatively associated with respective instances 636, 638, and 640 in the runtime server 302 via respective proxies 642, 644, and 646. A machine terminal session 648 manages the sessions 636 and 638, holds a session object 650, and interoperates with a security service 652 to perform the above-noted security validation operations for the session object 650.

Thus, as can be seen in the example implementation of FIG. 6, each client application may interoperate with one or more services provided by one or more servers. More specifically, to the extent a client application requires access to a process control database, that client application establishes a session (e.g., a communication link) with a server providing the required database access service(s). For example, in the example implementation of FIG. 6, the application 610 establishes a session (e.g., via the session service 618) in the database server 608 and makes use of the DataAccess service 626 in the database server 608. In this way, a client application can be implemented using a plurality of loosely coupled (or substantially data independent) services, each of which may be hosted on a different server. The client applications then communicate with services as needed by each of the applications via one or more proxies and one or more session service objects in each of the hosting servers.

FIG. 7 is a more detailed diagrammatic view of runtime services 700 that may be provided by the runtime server 302 (FIG. 3). In general, the runtime services 700 provide access to local and remote runtime process control information. As shown in FIG. 7, the runtime services 700 may include the data access service 310, an upload service 704, a Fieldbus commissioning service 706, a runtime session service 708, a download service 710, a commissioning service 712, a subsystem service 714, and a download listener service 716.

The data access service 310 provides functions that enable the reading and writing of parameters in a runtime database (e.g., a runtime database containing process control parameter values within the example process control system 10 of FIG. 1). Additionally, the data access service 310 enables the enumeration of collections of items (e.g., commissioned controller nodes) in the runtime database.

The upload, download, and download listener services 704, 710, and 716 enable the uploading and downloading of data to the runtime database, the Fieldbus commissioning and commissioning services 706 and 712 enable the commissioning of field devices within the runtime database, and the runtime session service 708 performs security functions in cooperation with the machine terminal session 720 and the server session service 718 in the manners described above in connection with the example implementation of FIG. 6.

Figure 8:
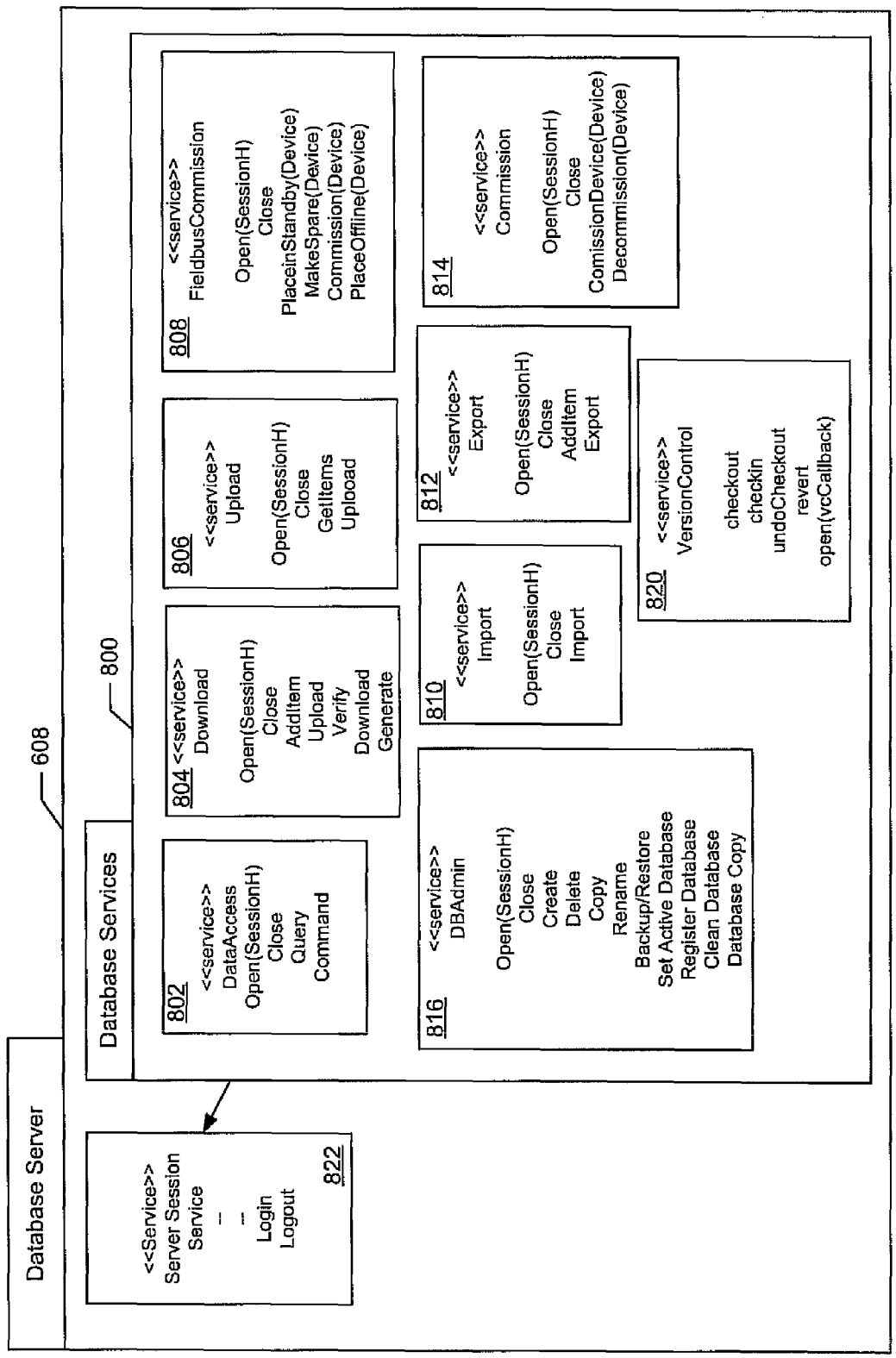
FIG. 8 is a more detailed diagrammatic view of example database services that may be provided by the database server of FIG. 6.

FIG. 8 is a more detailed diagrammatic view of example database services 800 that may be provided by the database server 608. As shown in FIG. 8, the database services 800 may include a data access service 802, a download service 804, an upload service 806, a Fieldbus commissioning service 808, an import service 810, an export service 812, a commissioning service 814, a database administration service 816, and a version control service 820. The data access service 802 provides functions to query and update a database. The data access service 802 also provides a command function that allows commands issued by a client application to be executed against the database in the database server 608. Each command may include a plurality of navigation and update operations to be applied to the database. Additionally, each command may execute in a single database transaction. The commands are composed in the application and conveyed as strings that are, in turn, interpreted (e.g., compiled and executed) as scripts in the database server 608. Preferably, but not necessarily, the commands are parameterized so that a common script can be used for all similar operations. The database server 608 may cache and pre-compile scripts to enhance execution speed. In one particular example, an update command sent to the database server 608 by a client application may trigger a callback to the client interface if version control actions (i.e., version control services) are needed. Any updates available are collected from the database within the database server 608 following execution of the command and its synchronous return to the calling routine.

The download service 804 may be implemented as an interface that supports sequencing in the database server 608. The download service 804 interface provides functions to add items to a download list, check and perform uploads, to check dependencies, verify downloads, and to send download items to a target system. The download service 804 may be configured to interoperate (e.g., as shown in FIG. 6) with the runtime data access service 702 (FIG. 7) to perform uploads. The download service 804 may also interoperate with the runtime commissioning service 712 (FIG. 7) to ensure that devices are commissioned, and may interoperate with the runtime download service 710 (FIG. 7) to convey download scripts.

The import service 810 may also be implemented as a sequenceable interface in the database server 608. The import service 810 may provide functions to specify an import file, specify import options, and to import the requested data. The interface of the import service 810 may also provide a callback that enables the calling client to read the import file for the server 608 and to report the progress of the import.

The export service 812 may also be implemented as a sequenceable interface. The export service 812 may include an interface that enables the export service 812 to add items to an export list and then perform the export. Additionally, the export service 812 may provide a callback interface on the calling client application that enables the client application to write the export file for the server and report the progress of the export.

The database administration service 816 provides functions that enable the creation, deletion, backup, and restoration of databases. The version control service 820 provides functions that enable the administration of versions (e.g., different versions of services).

Figure 9:
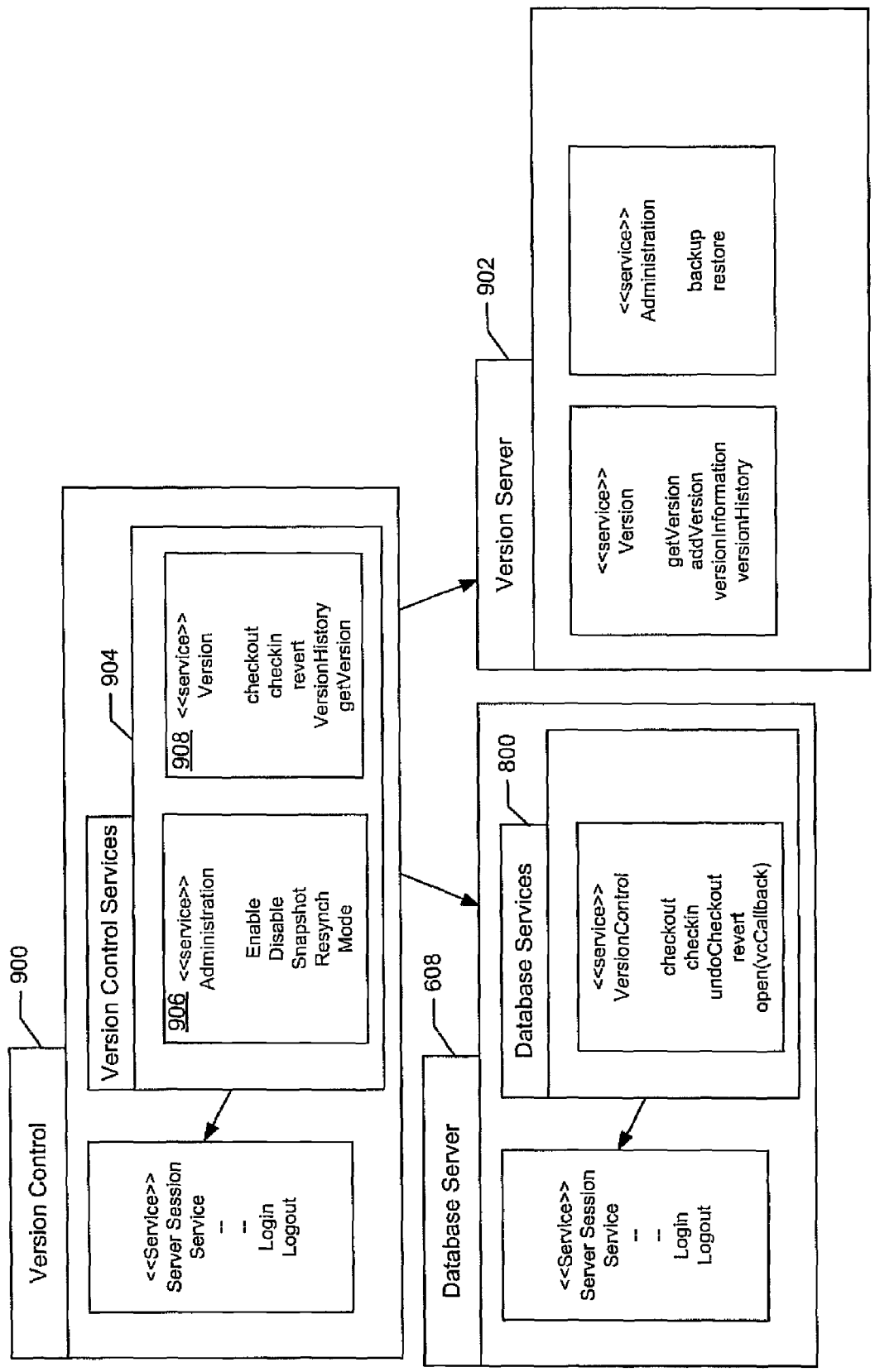
FIG. 9 is a diagram depicting an example manner in which a version control server, a version server, and the database server of FIG. 6 may interoperate.

FIG. 9 is a diagram depicting an example manner in which a version control server 900, a version server 902, and the database server 608 may interoperate. As depicted in FIG. 9, the version control server 900 includes a plurality of version control services 904. The version control services 904 may include an administration service 906 and a version service 908.

Figure 10:
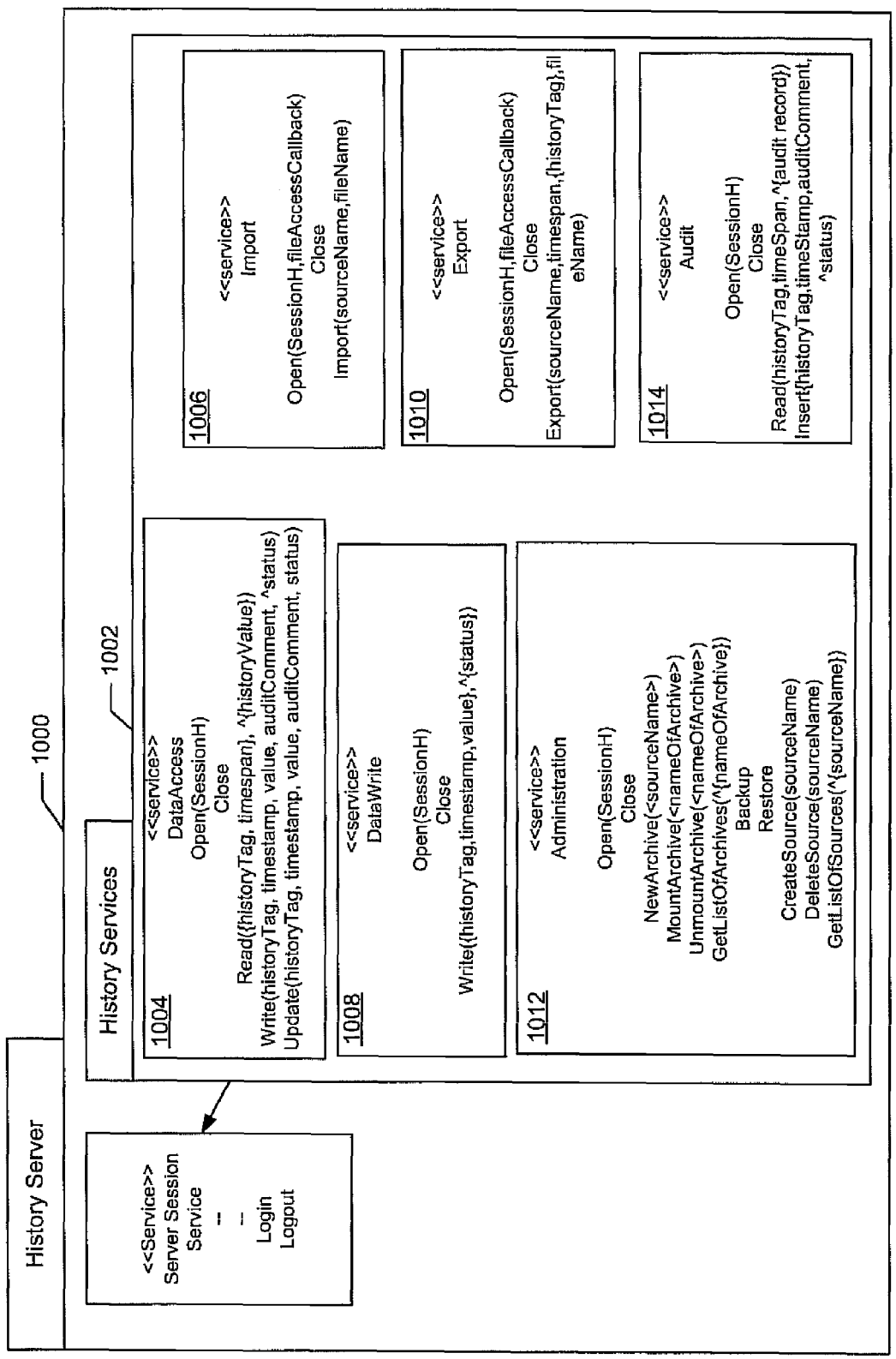
FIG. 10 is a diagrammatic view of an example history server that may provide a plurality of history services.

FIG. 10 is a diagrammatic view of an example history server 1000 that may provide a plurality of history services 1002. The history services 1002 may include a data access service 1004, an import service 1006, a data write service 1008, an export service 1010, an administration service 1012, and an audit service 1014. In general, the history services 1002 enable client applications to access or query for historical process control information. More specifically, the data access service 1004 enables the reading of history information over a specified time period, writing history information including time information (e.g., time stamps) and comments, and updating history information including time information and comments. The import service 1006 enables the importing of information within a specified file. The data write service 1008 may be called to write data to the history server database. The export service 1010 may be called to export a file. The administration service 1012 provides functions that enable the administration of history information such as, for example, creating, deleting, and moving archives of historical data.

Figure 11:
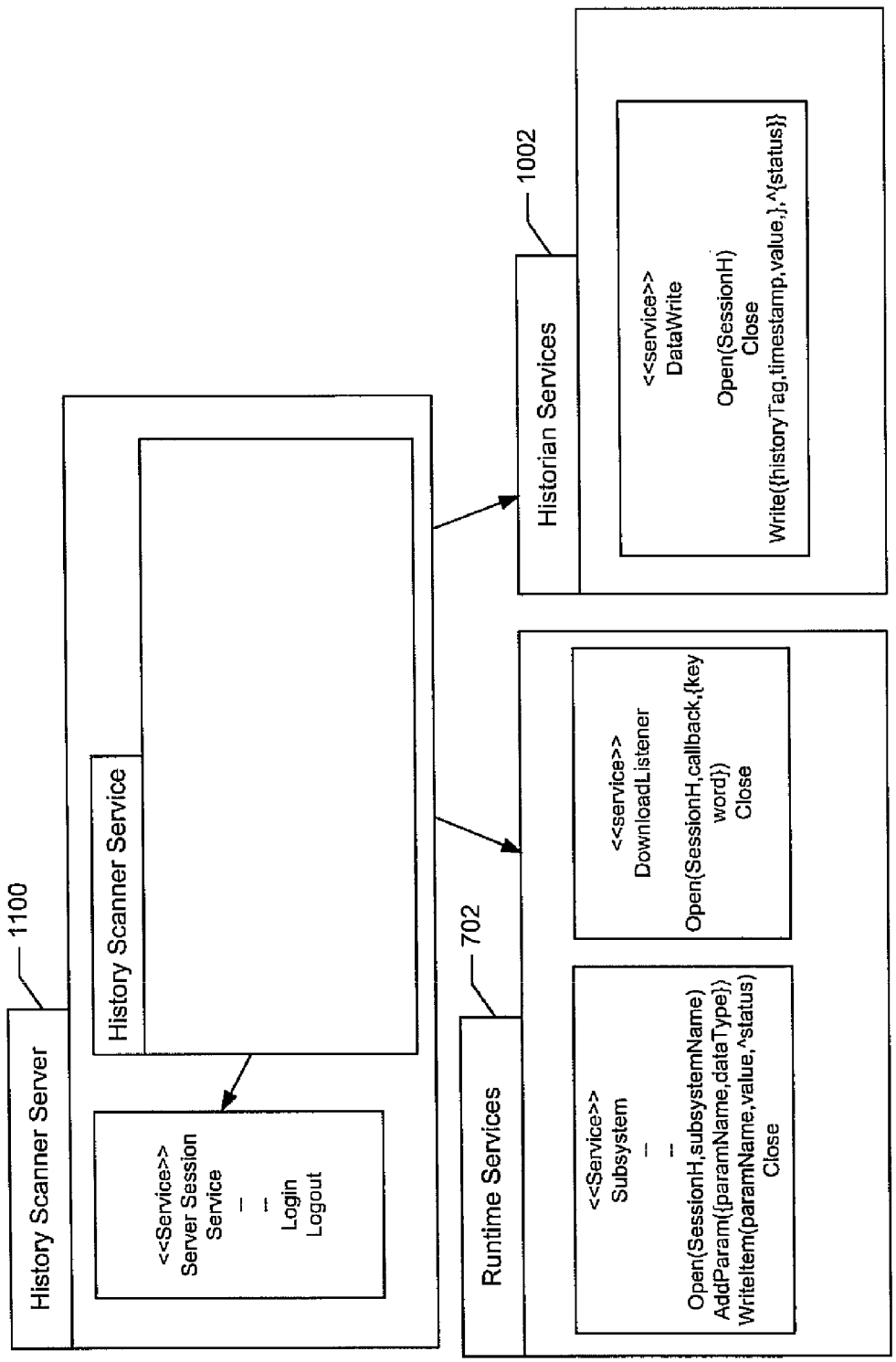
FIG. 11 is a diagram depicting an example history scanner server and the manner in which the history scanner server may interoperate with the example runtime services of FIG. 7 and the example history services of FIG. 10.

FIG. 11 is a diagram depicting an example history scanner server 1100 and the manner in which the history scanner server 1100 may interoperate with the runtime services 702 (FIG. 7) and history services 1002 (FIG. 10). As depicted in FIG. 11, the history scanner server 1100 does not provide any of its own services but, rather, uses the runtime services 702 and history service 1002.

Figure 12:
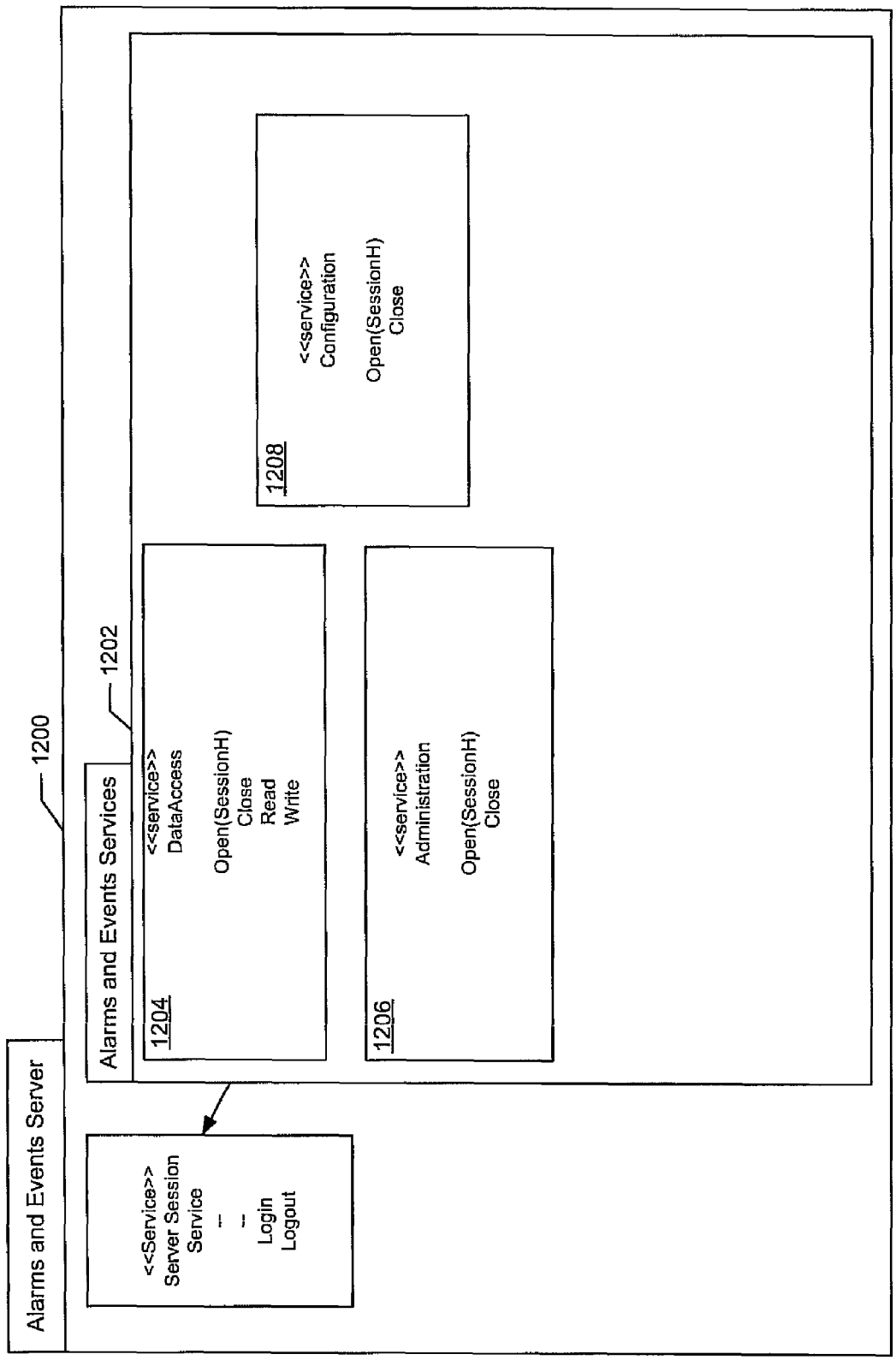
FIG. 12 depicts an example alarms and events server that may be used to implement the example service-oriented architecture described herein.
Figure 13:
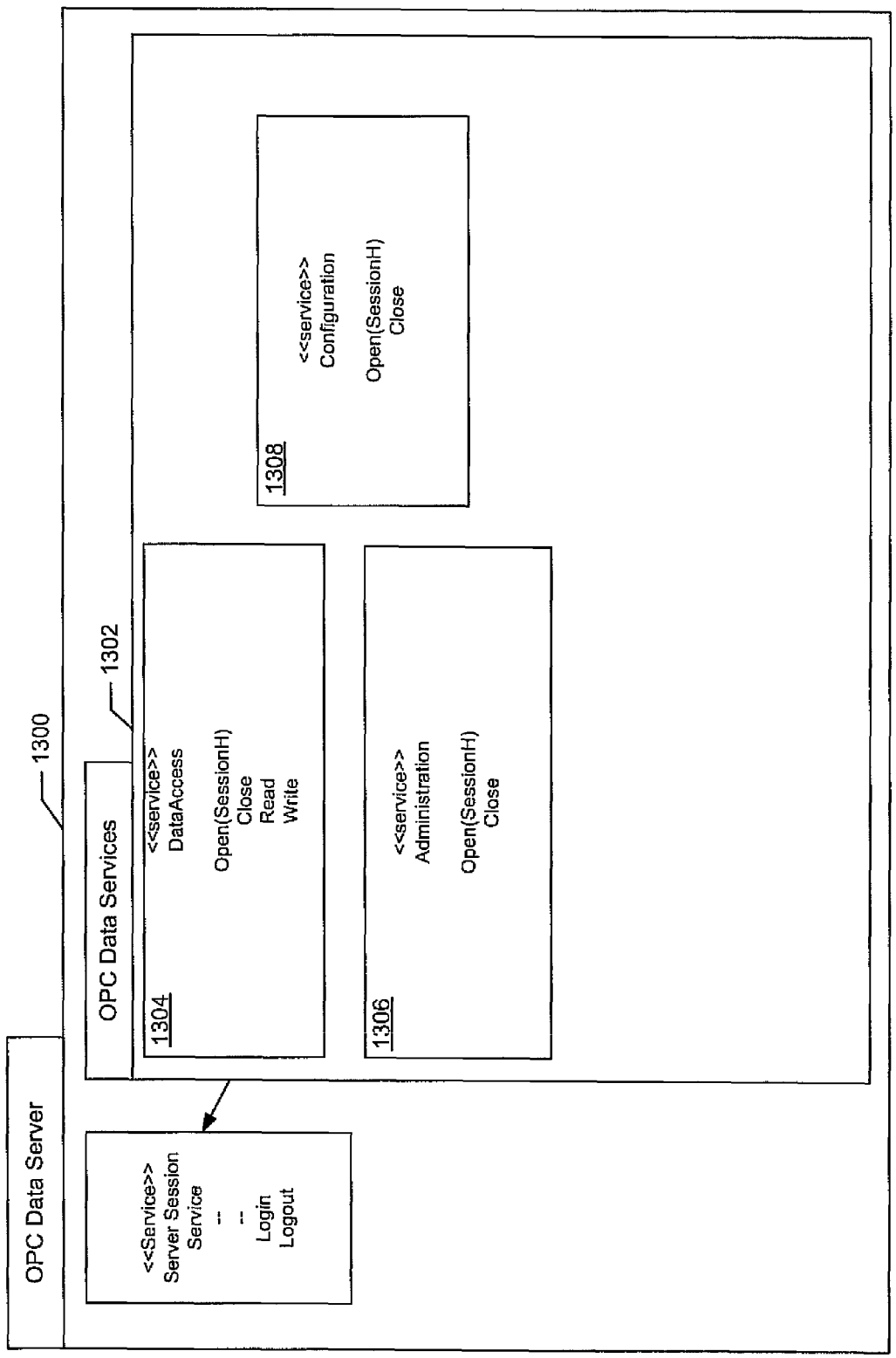
FIG. 13 depicts an example OPC data server that may be used to implement the example service-oriented architecture described herein.

FIGS. 12 and 13 depict an alarms and events server 1200 and an OPC data server 1300, respectively. The alarms and events server 1200 provides a plurality of services 1202 including a data access service 1204, an administration service 1206, and a configuration service 1208. The OPC data server 1300 provides a plurality of services 1302 including a data access service 1304, an administration service 1306, and a configuration service 1308.

Figure 14:
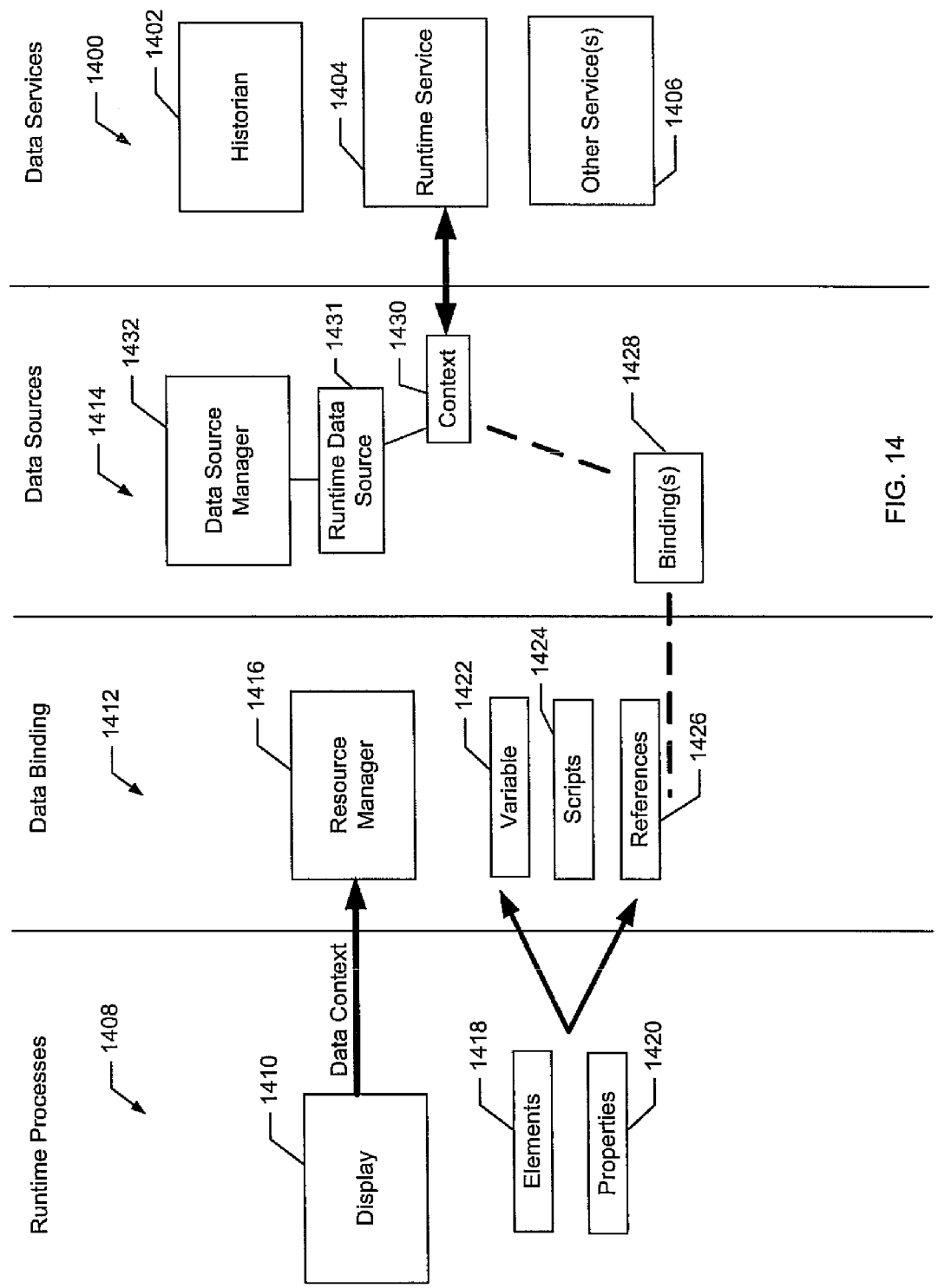
FIG. 14 depicts an example of one manner in which the example service-oriented architecture described herein may be used to link or bind runtime processes associated with client applications to data services or sources.

FIG. 14 depicts an example of one manner in which the example service-oriented architecture described herein may be used to link or bind user interface display graphics associated with client applications to variables, scripts, and/or data services or sources. As depicted in FIG. 14, one or more data services 1400 such as, for example, an historian data service 1402, a runtime service 1404, and/or any other data services 1406, some of all or which may be implemented in a manner similar to or identical to the example services discussed above in connection with FIGS. 2, 3, and 7-13, may be linked, communicatively coupled, or otherwise operatively coupled to one or more runtime processes 1408. The runtime processes 1408 may include any desired runtime processes or applications. However, in the example of FIG. 14, the runtime processes 1408 include a graphical user interface or display application 1410 that enables a user to view and/or modify process control data such as, for example, process control parameter values, historical process-related information, trend information, maintenance information, alarm or alert information, etc.

As is also depicted in FIG. 14, the communicative coupling or linkage between the runtime processes 1408 and the data services 1400 is implemented using data binding operations or processes 1412 and data source(s) operations or processes 1414. In general, the runtime processes 1408, the data binding processes 1412, and the data sources processes 1414 may be performed by, for example, the client 204 (FIG. 2) and the data services 1400 may, for example, be performed by the server 202 (FIG. 2). More specifically, the processes associated with the client 204 (FIG. 2) including the runtime processes 1408, the data binding processes 1412, and the data sources processes 1414 may be implemented using the Avalon operating system framework provided by Microsoft Corporation. The Avalon framework is well known and, thus, only certain aspects of the Avalon framework are discussed to facilitate an understanding of the example apparatus, methods, and articles of manufacture described herein. Further, it should be understood that while the Avalon framework provided by Microsoft Corporation is one particularly useful framework for implementing the examples described herein, any other suitable software framework could be used instead of or in addition to the Avalon framework.

Turning in more detail to FIG. 14, the data binding-related processes 1412 include a resource manager 1416, which creates and tracks variables, scripts, and references to data sources as described in greater detail below. Each display (e.g., the display 1410) is managed by its own resource manager instance (e.g., the resource manager 1416). As shown in FIG. 14, the example display 1410 includes graphical elements 1418 and associated properties 1420, which are associated with one or more variables 1422, scripts (i.e., executable software scripts) 1424, and data source references 1426 that are, in turn, coupled, linked, or bound via one or more bindings or binding object(s) 1428 of a context 1430 to one or more of the data services 1400. The binding object 1428 may include a string representation of the location of a specific data item within a data source (e.g., one or more of the data services 1400) and, thus, the binding object 1428 is specific to a data source. Additionally, the string representation may contain a reference to an alias, which may be changed during runtime. As shown, the context 1430 is also coupled to a runtime data source 1431 and a data source manager 1432, which is discussed below.

As depicted in FIG. 14, the resource manager 1416 receives a data context from the display 1410. In general, the data context is composed of the properties 1420 used by the display 1410 when rendering the elements 1418. The resource manager 1416 is configured to map, relate, or otherwise associate the properties 1420 associated with the data context to appropriate ones of the variables 1422, scripts 1424, and references 1426. Additionally, the resource manager 1416 may be further configured to map, relate, or otherwise associate the properties 1420 to one or more of the data services 1400 via the bindings 1428, the context 1430, and the data source manager 1432. The mappings used by the resource manager 1416 to relate the properties 1420 of the display 1410 to the variables 1422, the scripts 1424, the references 1426, and/or the data services 1400 can be established during a system configuration operation by, for example, a configuration engineer or any other system user. Thus, in contrast to many known process control system displays or user interfaces, the runtime characteristics of the display 1410 or, more generally, the runtime processes 1408, are not statically defined by the software composing the applications associated with the runtime processes 1408. On the contrary, the resource manager 1416 is configured to establish the relationships between the properties 1420 of the display 1410 and one or more of the variables 1422, the scripts 1424, the references 1426, and the data sources 1400 at runtime.

In operation, the resource manager 1416 may receive information related to a change in a variable, value, textual name, etc. In some cases, the data change may be conveyed via a change in the data context that is provided to the resource manager 1416. More specifically, in those cases, a user-initiated change to one or more of the properties 1420 may invoke one or more of the scripts 1424 to cause one or more of the values associated with the variables 1422 and/or the references 1426 to change. In cases where the changes are related to data stored in one or more of the data services 1400, changes to the objects managed by the resource manager 1416 may then be automatically propagated to an appropriate one or more of the data services 1400 via the bindings 1428 and the context object 1430. In other cases, data changes may occur within one or more of the data services 1400 (e.g., as a result of a change in process variable value) and the changes may be automatically propagated via the context 1430 and bindings 1428 to appropriate ones of the properties 1420 via the mapping functionality provided by the resource manager 1416.

The data source manager 1432 creates and manages context objects (e.g., the context object 1430), which are used to maintain client state information relating to a collection of binding objects (e.g., the binding object 1428) associated with a data source. In the case of displays associated with a graphical user interface, there is a one-to-one correspondence between the context objects and the displays. In other words, there is one context per display and each context contains only the bindings associated with that display. Thus, in the example of FIG. 14, the context object 1430 corresponds uniquely to the display 1410.

A context object also provides data update mechanisms, one of which is event based and initiates updates in response to each and every event, and another of which is collated in nature and collects a plurality of data change events and periodically (e.g., based on a timer) initiates updates by sending a list of changed binding items to a data source in response to the timer. Of course, responding individually to each event may impair performance (e.g., slow responsiveness) of the runtime processes 1408 and/or the overall process control system (e.g., the process control system 10 of FIG. 1) if there is a relatively large number of events to process. Thus, responding periodically to a list of dirty bindings (e.g., collected bindings for which data has changed but has not yet been passed to a runtime process) may improve overall performance. Connections between the context object 1430 and the data services 1400 may be implemented using, for example, the Indigo framework provided by the Microsoft Corporation.

Although the flow of change information associated with the example of FIG. 14 is described as being initiated at the display 1410 and automatically propagated to one or more of the data services 1400 via the resource manager 1416, the binding 1428, the data source manager 1432, and the context 1430, data change information could alternatively or additionally be automatically propagated from one or more of the data services 1400 to the display 1410.

Figure 15:
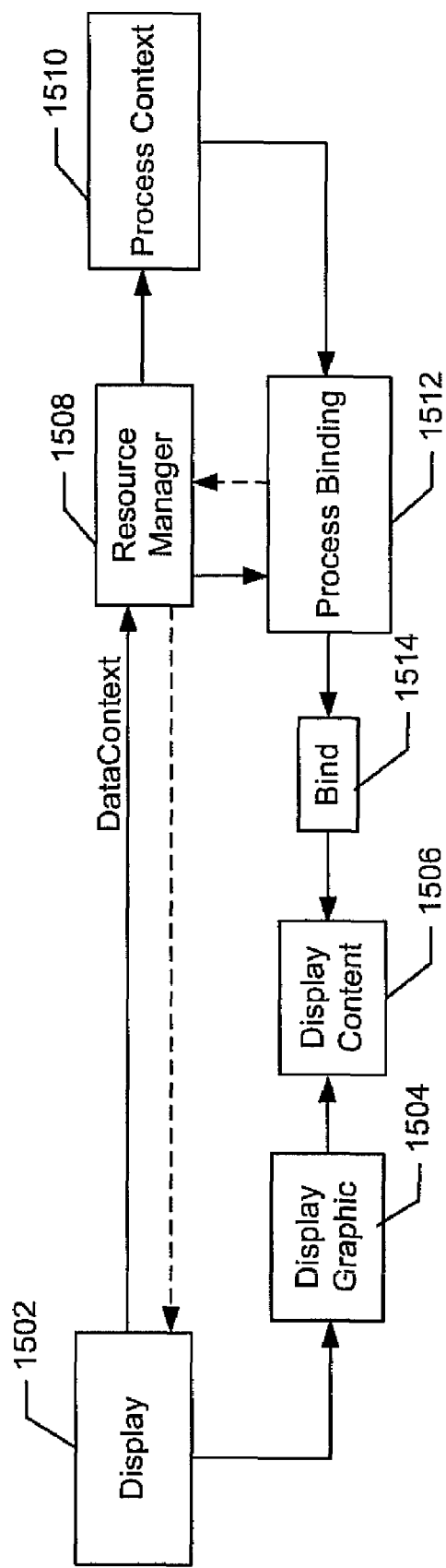
FIG. 15 depicts a more detailed example of one manner in which user interface display graphics may be linked or bound to data services or sources.

FIG. 15 depicts an example of one manner in which user interface display graphics may be linked or bound to data services or sources. As depicted in FIG. 15, a display (e.g., an application or other runtime entity that provides a display) 1502 includes a display element or graphic 1504 which, in turn, is associated with a parameter or display content 1506. The display 1502 may be a user interface associated with one or more process control-related applications and, in that case, the graphic 1504 may be a process control-related graphic such as, for example, a text box for holding a process control value, a graphic representation of a process control device such as a pump, valve, etc. The display content 1506 may include textual information (e.g., in the case that the display graphic 1504 is a text box), a color (e.g., one of a plurality of fill colors) representative of a process condition (e.g., red may be indicative of a parameter value that is approaching or that has exceeded a predetermined limit and/or the need to take corrective action, a rotational speed of a graphic element (e.g., a fan or pump impeller), a three dimensional view of a motor or other device vibrating, moving, etc., and/or any other content.

The display 1502 is communicatively or operatively coupled to a resource manager instance 1508 which is, in turn, communicatively or operatively coupled to a process context 1510 and a process binding 1512. The process context 1510 may be configured to provide collated data change notifications or event driven data change notifications to the process binding 1512. The process binding 1512 may reference data in a fixed memory location within a data source or service and/or may reference an alias for data in a data source or service. The process binding 1512 is communicatively or operatively coupled to the display content 1506 via a binding object 1514.

In operation, the resource manager 1508 holds a data context or parameters used by the display 1502 to render the display graphic 1504 and the display content 1506. The resource manager 1508 maps, relates, or otherwise associates at least one of the properties associated with the display 1502 to data provided by the process context 1510, which provides a data landing site for data stored within a data service (e.g., one of the data services 1400 shown in FIG. 14). In other words, the process context 1510 may be implemented using a context object such as, for example, the context object 1430 (FIG. 14) and, thus, functions to operatively or communicatively couple information from a data service or other data source to the resource manager 1508 and ultimately the display content 1506 and, thus, the display 1502. The process context 1510 may be configured to send data change information to the process binding 1512 in a collated manner (e.g., periodically send a collection of changed data information) to the process binding 1512 or in response to each data change event. The process context 1510 is configured to receive information from the resource manager 1508 informing the process context 1510 of the data for which the resource manager 1508 requires change notifications. Thus, the process context 1510 may be configured to provide only data change notifications relating to data associated with the data context of the display 1502 held by the resource manager 1508. In any case, the when the process binding 1512 receives notification from the process context 1510 that one or more data values have changed, the process binding 1512 binds (via the binding 1514) the new value(s) to the display content 1506 and then provides a change notification to the resource manager 1508. Upon receiving the change notification from the process binding 1512, the resource manager 1508 calls a property change method on the display 1502, thereby causing the display 1502 to update to incorporate the newly bound data.

The functional blocks or operations described herein may be implemented using any desired combination of software, firmware and hardware. For example, one or more microprocessors, microcontrollers, application specific integrated circuits (ASICs), etc. may access instructions or data stored on machine or processor accessible storage media to carry out the methods and to implement the apparatus described herein. The storage media may include any combination of devices and/or media such as, for example, solid state storage media including random access memory (RAM), read-only memory (ROM), electrically erasable programmable read-only memory (EEPROM), etc., optical storage media, magnetic storage media, etc. In addition, software used to implement the functional blocks may additionally or alternatively be delivered to and accessed by the processor or other device or devices executing the software via the Internet, telephone lines, satellite communications, etc.

Figure 16:
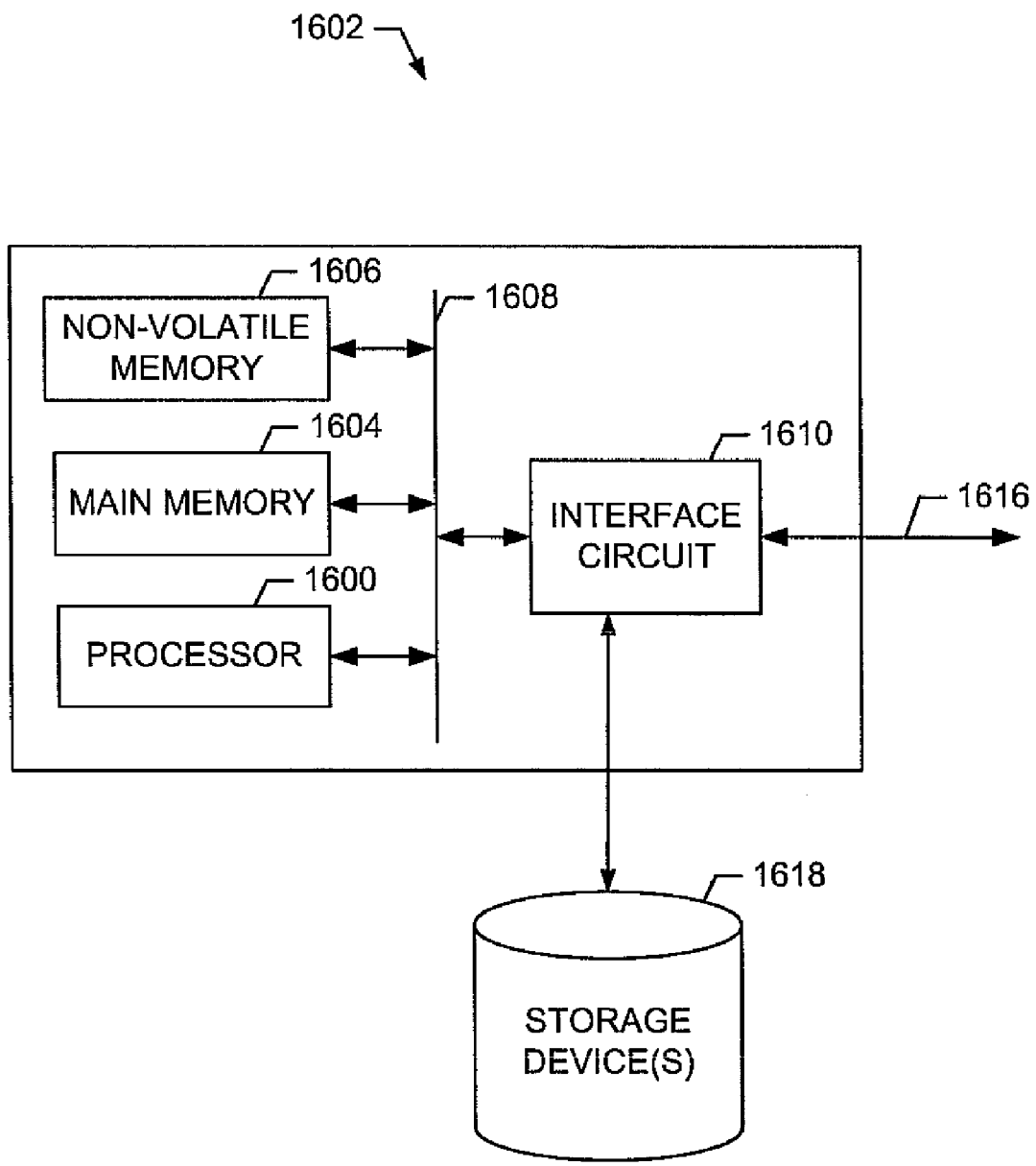
FIG. 16 depicts an example processor system that may be used to implement the apparatus and methods described herein.

FIG. 16 depicts an example processor system 1602 that may be used to implement the apparatus and methods described herein. The example processor-based system 1602 may be, for example, a server, a personal computer, or any other type of computing device.

The processor 1600 may, for example, be implemented using one or more Intel® microprocessors from the Pentium® family, the Itanium® family or the XScale® family. Of course, other processors from other families and companies are also appropriate. The processor 1600 is in communication with a main memory including a volatile memory 1604 and a non-volatile memory 1606 via a bus 1608. The volatile memory 1604 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1606 may be implemented by flash memory and/or any other desired type of non-volatile memory device. Access to the memory 1604 is typically controlled by a memory controller (not shown) in a conventional manner.

The system 1602 also includes an interface circuit 1610. The interface circuit 1610 may be implemented by any type of well-known interface standard to, for example, enable the system 1602 to communicate via one or more of the links 24, 32, 40, 42, 46, and 48 of FIG. 1.

The system 1602 also includes one or more mass storage devices 1618 for storing software and/or data. Examples of such mass storage devices include floppy disk drives, hard drive disks, compact disk drives and digital versatile disk (DVD) drives.

Although certain methods and apparatus and articles of manufacture have been described herein, the scope of coverage of this patent is not limited thereto. To the contrary, this patent covers all methods, apparatus and articles of manufacture fairly falling within the scope of the appended claims either literally or under the doctrine of equivalents.

What is claimed is:

1. A method of conveying process control information between a client process and a server process in a process control system, comprising:
   establishing the server process including a plurality of process control services, each of which has a corresponding service interface;
   establishing the client process having a different proxy for each of the plurality of process control services to which the client process establishes a communicative connection, wherein establishing the client process comprises executing software on a processor-based stem to provide one or more process control related applications that can be independently versioned; and
   providing endpoint information associated with the service interfaces to the client process to enable the conveyance of process control information between the client process and the server process.

2. A method as defined in claim 1, wherein establishing the server process comprises executing software on a processor-based system to provide a server.

3. A method as defined in claim 1, wherein establishing the server process including the plurality of process control services comprises establishing at least one of a discovery service, a session service, a runtime service, a database service, a versioning service, an historian service, an alarms and event service, or an Object Linking an Embedding (OLE) for Process Control (OPC) data service.

4. A method as defined in claim 1, wherein the one or more process control related applications comprise at least one of a browser application, a configuration application, a maintenance application, or a diagnostic application.

5. A method as defined in claim 1, wherein providing the endpoint information associated with the service interfaces to the client process comprises providing a uniform resource identifier to the client process.

6. A method as defined in claim 1, wherein providing the endpoint information associated with the service interfaces to the client process comprises calling a discovery service that locates the endpoint information.

7. A method as defined in claim 6, wherein providing the endpoint information associated with the service interfaces to the client process comprises receiving a uniform resource identifier from the discovery service.

8. A method as defined in claim 1, further comprising establishing a session for the client process in the server process based on the endpoint information and at least one of the proxies.

9. A method as defined in claim 1, further comprising establishing another server process and conveying information between the client process and the other server process.

10. A method as defined in claim 1, wherein the one or more process control related applications can be versioned independently from the process control services.

11. A method as defined in claim 1, wherein the process control services are substantially data independent such that the process controls services can be independently versioned.

12. A method as defined in claim 1, wherein the process control services can be independently versioned without altering the client process via which the communicative connection is established.

13. A method as defined in claim 1, wherein the one or more process control related applications are substantially data independent.

14. A method as defined in claim 1, wherein the one or more process control related applications can be independently versioned without altering the process control services to which the client process establishes the communicative connection.

15. A method as defined in claim 1, wherein the process control services can be versioned independently from the one or more process control related applications.

16. An apparatus for conveying process control information between a client process and a server process in a process control system, comprising:
   a processor coupled to a memory and programmed to:
      establish the server process including a plurality of process control services, each of which has a corresponding service interface;

establish the client process having a different proxy for each of the plurality of process control services to which the client process establishes a communicative connection, wherein the processor is programmed to establish the client process by executing software to provide one or more process control related applications that can be independently versioned; and provide endpoint information associated with the service interfaces to the client process to enable the conveyance of process control information between the client process and the server process.

17. An apparatus as defined in claim 16, wherein the processor is programmed to establish the server process including the plurality of process control services by establishing at least one of a discovery service, a session service, a runtime service, a database service, a versioning service, an historian service, an alarms and event service, or an Object Linking an Embedding (OLE) for Process Control (OPC) data service.

18. An apparatus as defined in claim 16, wherein the one or more process control related applications comprise at least one of a browser application, a configuration application, a maintenance application, or a diagnostic application.

19. An apparatus as defined in claim 16, wherein the processor is programmed to provide the endpoint information associated with the service interfaces to the client process by providing a uniform resource identifier to the client process.

20. An apparatus as defined in claim 16, wherein the processor is programmed to provide the endpoint information associated with the service interfaces to the client process by calling a discovery service that locates the endpoint information.

21. An apparatus as defined in claim 20, wherein the processor is programmed to provide the endpoint information associated with the service interfaces to the client process by receiving a uniform resource identifier from the discovery service.

22. An apparatus as defined in claim 16, wherein the processor is programmed to establish a session for the client process in the server process based on the endpoint information and at least one of the proxies.

23. An apparatus as defined in claim 16, wherein the processor is programmed to establish another server process and convey information between the client process and the other server process.

24. A machine readable medium having instructions stored thereon that, when executed, cause a machine to:
establish a server process including a plurality of process control services, each of which has a corresponding service interface;
establish a client process having a different proxy for each of the plurality of process control services to which the client process establishes a communicative connection, wherein the client process is established by providing one or more process control related applications that can be independently versioned; and
provide endpoint information associated with the service interfaces to the client process to enable the conveyance of process control information between the client process and the server process.

25. A machine readable medium as defined in claim 24, wherein the instructions, when executed, cause the machine to establish the server process including the plurality of process control services by establishing at least one of a discovery service, a session service, a runtime service, a database service, a versioning service, an historian service, an alarms and event service, or an Object Linking an Embedding (OLE) for Process Control (OPC) data service.

26. A machine readable medium as defined in claim 24, wherein the one or more process control related applications comprise at least one of a browser application, a configuration application, a maintenance application, or a diagnostic application.

27. A machine readable medium as defined in claim 24, wherein the instructions, when executed, cause the machine to provide the endpoint information associated with the service interfaces to the client process by providing a uniform resource identifier to the client process.

28. A machine readable medium as defined in claim 24, wherein the instructions, when executed, cause the machine to provide the endpoint information associated with the service interfaces to the client process by calling a discovery service that locates the endpoint information.

29. A machine readable medium as defined in claim 28, wherein the instructions, when executed, cause the machine to provide the endpoint information associated with the service interfaces to the client process by receiving a uniform resource identifier from the discovery service.

30. A machine readable medium as defined in claim 24, wherein the instructions, when executed, cause the machine to establish a session for the client process in the server process based on the endpoint information and at least one of the proxies.

31. A machine readable medium as defined in claim 24, wherein the instructions, when executed, cause the machine to establish another server process and convey information between the client process and the other server process.

32. An apparatus for communicating process control information, comprising:
a client having a plurality of service interface proxies, each of which corresponds to one of a plurality of service interfaces of a server and each of which is configured to communicate process control information to a communication port of the server, wherein the client comprises one or more independently versionable process control applications configured to interoperate with at least one of a plurality of process control services provided by the server.

33. An apparatus as defined in claim 32, wherein the communication port is associated with a uniform resource identifier.

34. An apparatus as defined in claim 32, wherein the plurality of process control services comprises at least one of a discovery service, a session service, a runtime service, a database service, a versioning service, an historian service, an alarms and events service, or an Object Linking an Embedding (OLE) for Process Control (OPC) data service.

* * * * *

UNITED STATES PATENT AND TRADEMARK OFFICE
CERTIFICATE OF CORRECTION

| | |
|---|---|
| PATENT NO. | : 7,984,096 B2 |
| APPLICATION NO. | : 11/556554 |
| DATED | : July 19, 2011 |
| INVENTOR(S) | : Beoughter et al. |

It is certified that error appears in the above-identified patent and that said Letters Patent is hereby corrected as shown below:

Column 17, line 67 (claim 1): Replace "stem" with --system--

Signed and Sealed this
Thirtieth Day of August, 2011

David J. Kappos
*Director of the United States Patent and Trademark Office*